(12) United States Patent
Morita et al.

(10) Patent No.: US 9,642,090 B2
(45) Date of Patent: May 2, 2017

(54) MOBILE COMMUNICATION SYSTEM AND USER TERMINAL

(71) Applicant: KYOCERA CORPORATION, Kyoto (JP)

(72) Inventors: Kugo Morita, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/913,616

(22) PCT Filed: Aug. 26, 2014

(86) PCT No.: PCT/JP2014/072342
§ 371 (c)(1),
(2) Date: Feb. 22, 2016

(87) PCT Pub. No.: WO2015/030017
PCT Pub. Date: Mar. 5, 2015

(65) Prior Publication Data
US 2016/0205714 A1 Jul. 14, 2016

(30) Foreign Application Priority Data

Aug. 30, 2013 (JP) ................................ 2013-179434

(51) Int. Cl.
*H04W 72/00* (2009.01)
*H04W 52/02* (2009.01)
(Continued)

(52) U.S. Cl.
CPC ... *H04W 52/0261* (2013.01); *H04W 56/0015* (2013.01); *H04W 72/02* (2013.01);
(Continued)

(58) Field of Classification Search
None
See application file for complete search history.

(56) References Cited

U.S. PATENT DOCUMENTS

2012/0033569 A1  2/2012  Tesanovic et al.
2013/0322413 A1* 12/2013 Pelletier ............ H04W 72/1289
370/336
(Continued)

FOREIGN PATENT DOCUMENTS

JP  2010-056955 A   3/2010
JP  2012-524443 A  10/2012
WO  02/056542 A1   7/2002

OTHER PUBLICATIONS

International Search Report issued in PCT/JP2014/072342; mailed Oct. 14, 2014.
(Continued)

Primary Examiner — Idowu O Osifade
(74) Attorney, Agent, or Firm — Studebaker & Brackett PC

(57) ABSTRACT

A mobile communication system comprises a first user terminal having a scheduling function of assigning a radio resource used for the D2D communication. When the scheduling function is enabled, the first user terminal broadcasts periodically or aperiodically a message including identification information indicating that the first user terminal is a scheduling terminal that performs the assignment of the radio resource.

22 Claims, 14 Drawing Sheets

(51) Int. Cl.
| | |
|---|---|
| H04W 56/00 | (2009.01) |
| H04W 72/04 | (2009.01) |
| H04W 72/12 | (2009.01) |
| H04W 74/08 | (2009.01) |
| H04W 72/02 | (2009.01) |
| H04W 92/18 | (2009.01) |
| H04W 76/02 | (2009.01) |

(52) U.S. Cl.
CPC ... *H04W 72/0486* (2013.01); *H04W 72/1263* (2013.01); *H04W 74/0833* (2013.01); *H04W 76/023* (2013.01); *H04W 92/18* (2013.01)

(56) References Cited

U.S. PATENT DOCUMENTS

2014/0153390 A1\* 6/2014 Ishii ............ H04W 76/023
370/230

2014/0242963 A1\* 8/2014 Novlan ............ H04W 48/16
455/418

OTHER PUBLICATIONS

Written Opinion issued in PCT/JP2014/072342; mailed Oct. 14, 2014.

3rd Generation Partnership Project; Technical Specification Group Services and System Aspects; Feasibility study for Proximity Services (ProSe); 3GPP TR 22.803 V12.1.0; Mar. 2013; pp. 1-45; Release 12; 3GPP Organizational Partners.

Nokia, NSN; D2D Comunication without network coverage; 3GPP TSG-RAN WG1 Meeting #74 R1-133495; Aug. 19-23, 2013; pp. 1-7; Barcelona, Spain.

Fujitsu; D2D discovery and synchronization based on clusters; 3GPP TSG-RAN WG1 Meeting #74 R1-133143; Aug. 19-23, 2013; pp. 1-7; Barcelona, Spain.

\* cited by examiner

LONG BSR MAC CONTROL ELEMENT

PRIORITY: LCG#0 > LCG#1 > LCG#2 > LCG#3

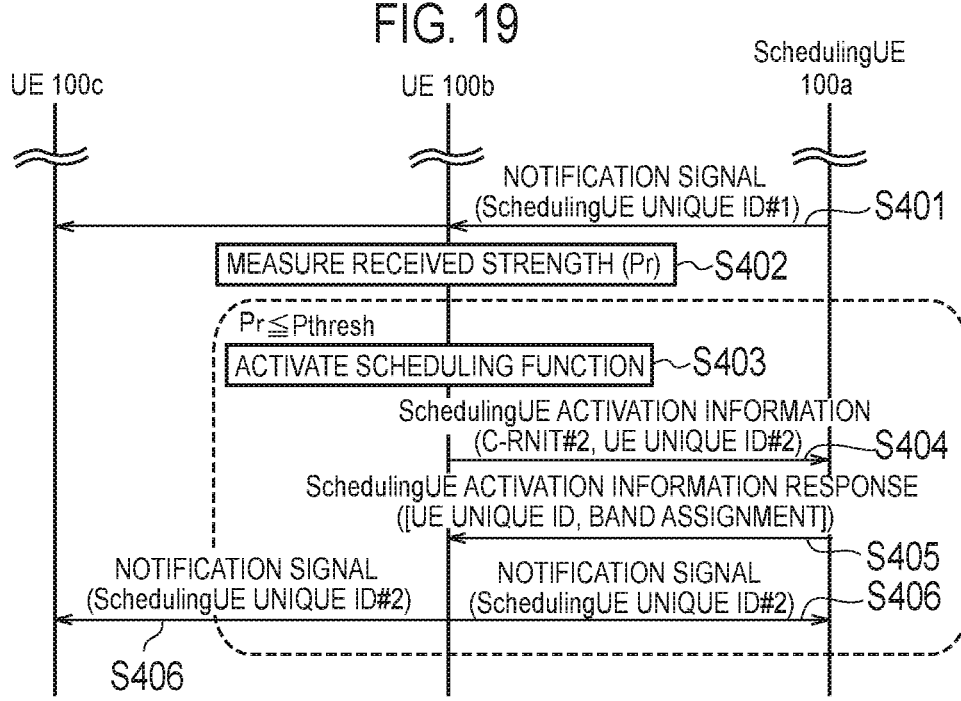
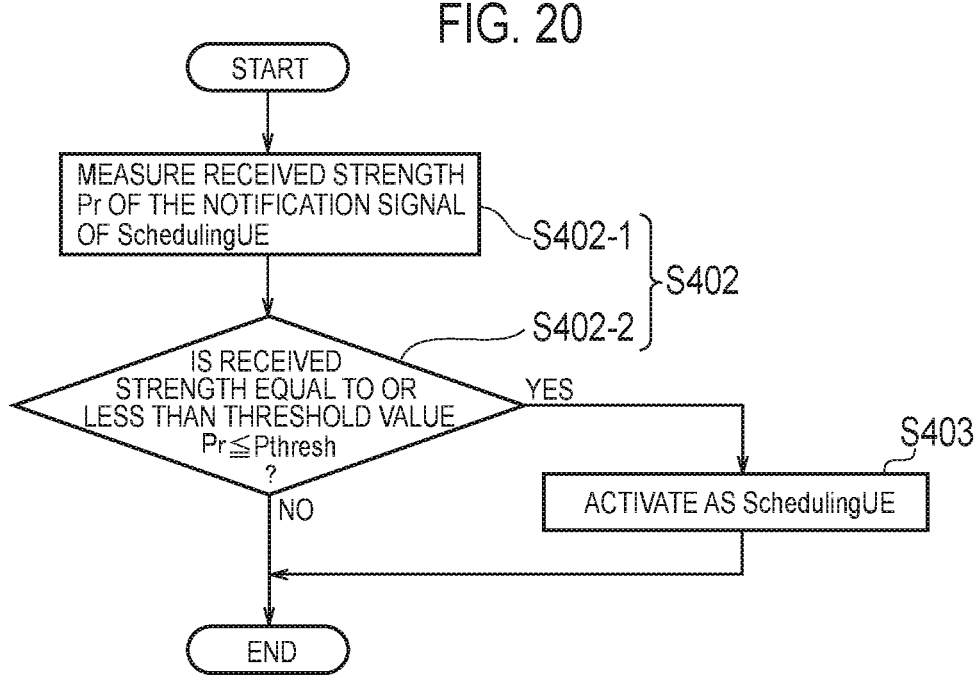

MOBILE COMMUNICATION SYSTEM AND USER TERMINAL

TECHNICAL FIELD

The present invention relates to a mobile communication system and a user terminal that support D2D communication.

BACKGROUND ART

In 3GPP (3rd Generation Partnership Project) which is a project aiming to standardize a mobile communication system, the introduction of Device to Device (D2D) communication is discussed as a new function after Release 12 (see Non Patent Literature 1).

In the D2D communication, a plurality of adjacent user terminals perform direct device-to-device communication without passing through a network. On the other hand, in cellular communication which is normal communication in a mobile communication system, a user terminal performs communication that passes through a network.

It is noted that cases are assumed where assignment of a radio resource used for the D2D communication is led by a network device such as a base station and the assignment thereof is led by a user terminal that performs the D2D communication. When the user terminal itself that performs the D2D communication performs the assignment of the radio resource, it is possible to perform the D2D communication even when a network situation is instable because a disaster such as an earthquake occurs, for example.

CITATION LIST

Non Patent Literature

[NPL 1] 3GPP technical report "TR 22.803 V12.1.0" March, 2013

SUMMARY OF INVENTION

A mobile communication system according to one embodiment is a mobile communication system that supports D2D communication that is direct device-to-device communication. The mobile communication system comprises a first user terminal having a scheduling function of assigning a radio resource used for the D2D communication. When the scheduling function is enabled, the first user terminal broadcasts periodically or aperiodically a message including identification information indicating that the first user terminal is a scheduling terminal that performs the assignment of the radio resource.

BRIEF DESCRIPTION OF DRAWINGS

FIG. 19 is a sequence chart for describing an operation of the case 1B in activating a scheduling function.
FIG. 20 is a flowchart for describing an operation of the case 1B in activating the scheduling function.

DESCRIPTION OF EMBODIMENTS

Figure 1:
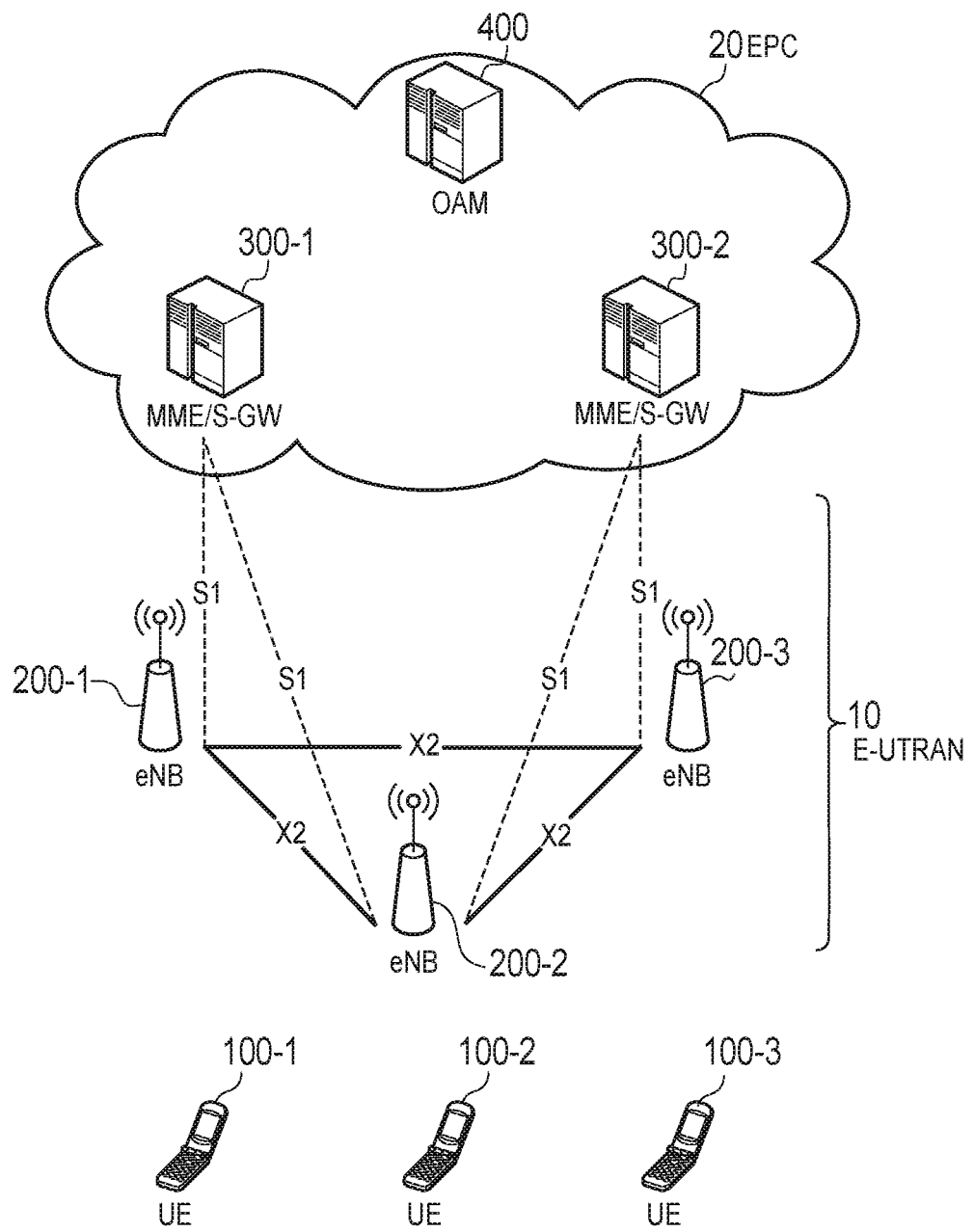
FIG. 1 is a configuration diagram of an LTE system.

[Overview of Embodiments]
When the network situation is instable because of the disaster occurring, it is assumed that the network is constructed by a plurality of user terminals that perform the D2D communication. In this case, when each user terminal performs the assignment of the radio resource, interference may occur due to overlapping of radio resources.

Therefore, the embodiments provide a mobile communication system and a user terminal with which it is possible to restrain radio resources from overlapping when a user terminal that performs D2D communication performs assignment of the radio resource.

A mobile communication system according to embodiments is a mobile communication system that supports D2D communication that is direct device-to-device communication. The mobile communication system comprises a first user terminal having a scheduling function of assigning a radio resource used for the D2D communication. When the scheduling function is enabled, the first user terminal broadcasts periodically or aperiodically a message including identification information indicating that the first user terminal is a scheduling terminal that performs the assignment of the radio resource.

The mobile communication system according to embodiments further comprises a second user terminal configured to search the scheduling terminal. When detecting a signal including the message by the searching for the scheduling terminal, the second user terminal establishes at least synchronization with the first user terminal broadcasting the message.

In the mobile communication system according to embodiments, the second user terminal uses a signal including the message or a synchronization signal transmitted from the first user terminal to establish synchronization with the first user terminal.

In the mobile communication system according to embodiments, in addition to the establishment of the synchronization, the second user terminal establishes a connection with the first user terminal.

In the mobile communication system according to embodiments, when detecting a signal including the message, the second user terminal starts a random access procedure for establishing a connection with the first user terminal, and the first user terminal transmits, on the basis of the random access procedure, a temporary identifier used for transmitting the radio resource assigned to the second user terminal, to the second user terminal.

In the mobile communication system according to embodiments, in the random access procedure, the second user terminal omits transmission of information for a connection in an RRC layer, and the second user terminal uses a setting value previously defined for the D2D communication to perform the connection in the RRC layer.

In the mobile communication system according to embodiments, in the random access procedure, the first user terminal omits transmission of a contention resolution message used for determining whether or not the random access procedure is successful.

In the mobile communication system according to embodiments, in between with the first user terminal, the second user terminal establishes only a connection in a PHY layer, and after establishing the connection in the PHY layer, the second user terminal starts standing by for a message in the PHY layer from the first user terminal.

In the mobile communication system according to embodiments, the second user terminal comprises a receiver configured to receive data from the first user terminal, and after establishing the connection with the first user terminal, when there is no data to be exchanged, the second user terminal performs a discontinuous reception in which the receiver is discontinuously activated.

In the mobile communication system according to embodiments, the second user terminal has the scheduling function, and when not detecting a signal including the message, the second user terminal enables the scheduling function.

In the mobile communication system according to embodiments, when a signal including the message is not detected and a battery remaining amount exceeds a threshold value, the second user terminal enables the scheduling function.

In the mobile communication system according to embodiments, after establishing a connection with the second user terminal, the first user terminal receives a buffer state report indicating an amount of untransmitted data from the second user terminal, and the first user terminal performs the assignment of the radio resource on the second user terminal, in accordance with the buffer state report.

In the mobile communication system according to embodiments, the untransmitted data is classified into a plurality of logical channel groups different in priority, the second user terminal transmits the buffer state report indicating an amount of the untransmitted data of each of the plurality of logical channel groups, and the first user terminal performs the assignment of the radio resource on the second user terminal, in accordance with the priority based on the buffer state report.

In the mobile communication system according to embodiments, the first user terminal performs the assignment of the radio resource on the second user terminal, after establishing the connection with the second user terminal, and instead of performing a retransmission process of retransmitting assignment information of the radio resource based on a retransmission request from the second user terminal, the first user terminal repeatedly transmits the assignment information of the radio resource in response to a request from the second user terminal or in accordance with a type of communication scheme with the second user terminal.

The mobile communication system according to the embodiments further comprises a third user terminal in which the assignment of the radio resource is not managed by the first user terminal, when a signal including the message from the third user terminal is detected and a synchronization timing for the D2D communication is deviated with the third user terminal, the first user terminal performs a correction for aligning the synchronization timing.

In the mobile communication system according to embodiments, in order to align the synchronization timing, the first user terminal matches a head of a subframe next to the predetermined subframe of the first user terminal with a head of a subframe of the third user terminal, without setting a predetermined subframe of the first user terminal.

The mobile communication system according to the embodiments further comprises a fourth user terminal different from the first user terminal and the second user terminal, after establishing a connection with the first user terminal, the second user terminal searches the scheduling terminal, and when detecting a signal including the message from the fourth user terminal, the second user terminal transmits, to the first user terminal, scheduling terminal information indicating that the signal including the message is detected from the fourth user terminal.

In the mobile communication system according to embodiments, after establishing a connection with the first user terminal, the second user terminal stops searching the scheduling terminal, and when detecting interference, the second user terminal resumes searching the scheduling terminal.

The mobile communication system according to the embodiments further comprises a fifth user terminal configured to broadcast specific information that is set toward a specific user terminal, when the specific information is received from the fifth user terminal and the specific user terminal is not the first user terminal, the first user terminal broadcasts the specific information in order to transfer the specific information.

In the mobile communication system according to embodiments, after establishing a connection with the first user terminal, the second user terminal newly detects a signal including the message from the first user terminal, and when a signal intensity of the newly detected signal including the message is equal to or less than a threshold value, the second user terminal enables the scheduling function of the second user terminal.

In the mobile communication system according to embodiments, after establishing a connection with the second user terminal, the first user terminal receives battery information indicating a state of a battery from the second user terminal, and the first user terminal requests, on the basis of the battery information and a battery remaining amount of the first user terminal, the second user terminal to act as the scheduling terminal instead of the first user terminal.

In the mobile communication system according to embodiments, when the second user terminal acts as the scheduling terminal, the first user terminal stops broadcasting the message in alignment with a timing at which the second user terminal starts broadcasting the message.

A user terminal according to the embodiments is a user terminal in a mobile communication system that supports D2D communication that is direct device-to-device communication. The user terminal comprises a controller configured to control a scheduling function of assigning a radio resource used for the D2D communication. When the scheduling function is enabled, the controller controls to broadcast periodically or aperiodically a message including identification information indicating that the user terminal is a scheduling terminal configured to perform the assignment of the radio resource.

A user terminal according to the embodiments is a user terminal in a mobile communication system that supports D2D communication that is direct device-to-device communication. The user terminal comprises a controller configured to control to search a scheduling terminal configured to perform assignment of the radio resource used for the D2D communication. When detecting a signal including the message including identification information indicating that another user terminal is the scheduling terminal, the controller controls to establish a connection with the another user terminal configured to broadcast the message.

[Embodiments]
(LTE System)

FIG. 1 is a configuration diagram of an LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 and the EPC 20 constitute a network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 controls a cell and performs radio communication with the UE 100 that establishes a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400. Further, the EPC 20 corresponds to a core network.

The MME is a network node for performing various mobility controls, etc., for the UE 100 and corresponds to a controller. The S-GW is a network node that performs transfer control of user data and corresponds to a mobile switching center.

The eNBs 200 are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Figure 2:
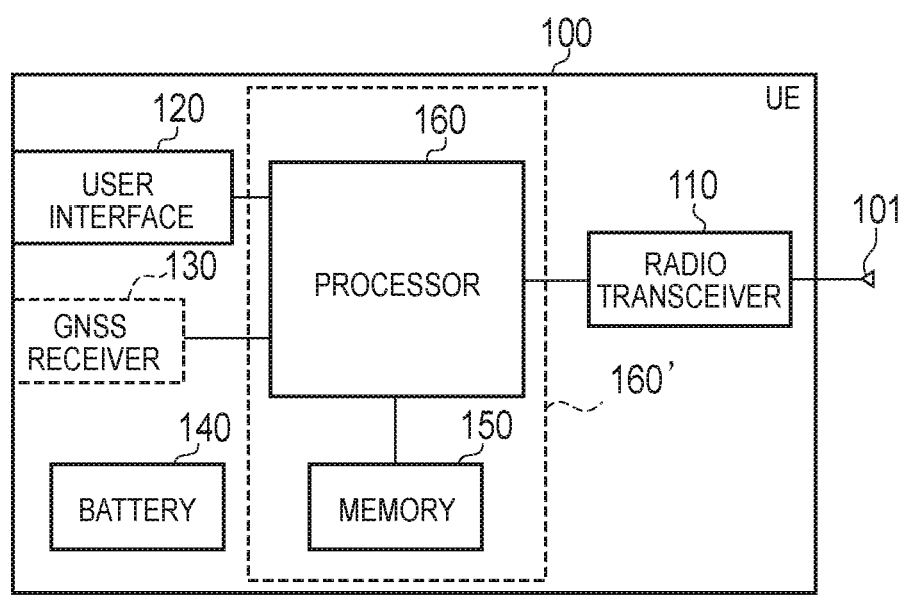
FIG. 2 is a block diagram of a UE.

Next, the configurations of the UE 100 will be described.
FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 constitute a controller.

In the present embodiments, the controller represents the plurality of UEs 100 to perform controlling of assigning radio resources used for the D2D communication. More information will be described later.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

Figure 3:
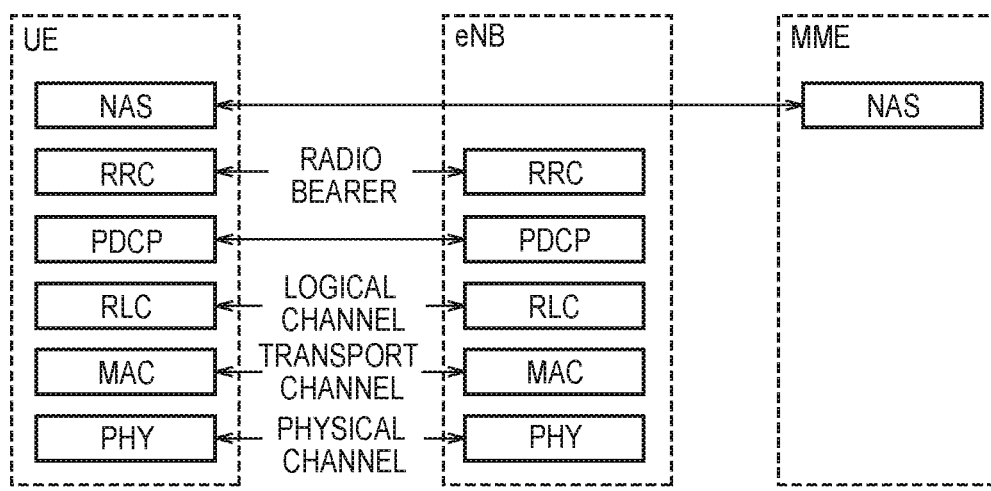
FIG. 3 is a protocol stack diagram of a radio interface in the LTE system.

FIG. 3 is a protocol stack diagram of a radio interface in the LTE system.

As illustrated in FIG. 3, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes MAC scheduler that determines an uplink and downlink transport format (a transport block size, a modulation and coding scheme, and the like) and an assignment resource block.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and decompression, and encryption and decryption.

The RRC layer is defined only in a control plane. Between the RRC layer of the UE 100 and the RRC layer of the eNB 200, a control signal (an RRC message) for various types of setting is transmitted. The RRC layer controls the logical channel, the transport channel, and the physical channel in response to establishment, re-establishment, and release of a radio bearer. When an RRC connection is established between the RRC of the UE 100 and the RRC of the eNB 200, the UE 100 is in a connected state, and when the RRC connection is not established, the UE 100 is in an idle state.

A NAS (Non-Access Stratum) layer positioned above the RRC layer performs session management or mobility management, for example.

Figure 4:
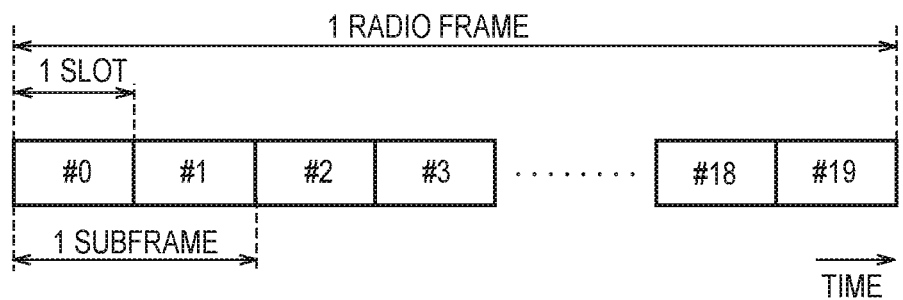
FIG. 4 is a configuration diagram of a radio frame used in an LTE system.

FIG. 4 is a configuration diagram of a radio frame used in the LTE system. In the LTE system, OFDMA (Orthogonal Frequency Division Multiplex Access) is applied to a downlink, and SC-FDMA (Single Carrier Frequency Division Multiple Access) is applied to an uplink, respectively.

As illustrated in FIG. 4, the radio frame is configured by 10 subframes arranged in a time direction, wherein each subframe is configured by two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. Each symbol is provided at a head thereof with a guard interval called a cyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time-period resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, cell-specific reference signals (CRSs) are distributed and arranged.

In the uplink, both ends in the frequency direction of each subframe are control regions mainly used as a physical uplink control channel (PUCCH). Furthermore, the center portion in the frequency direction of each subframe is a region mainly used as a physical uplink shared channel (PUSCH). Moreover, in each subframe, a demodulation reference signal (DMRS) and a sounding reference signal (SRS) are arranged.

(D2D Communication)

Next, description will be provided by comparing the D2D communication with the normal communication (cellular communication) of the LTE system.

Figure 5:
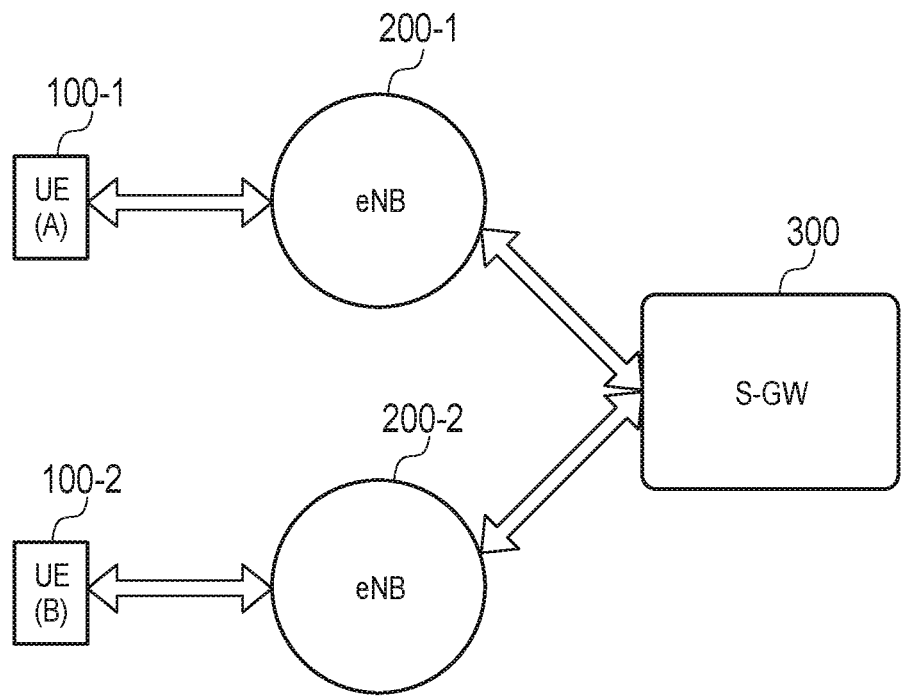
FIG. 5 is a diagram showing a data path in cellular communication.

FIG. 5 is a diagram showing a data path in the cellular communication. Here, a case is shown as an example in which the cellular communication is performed between a UE 100-1 that establishes a connection with an eNB 200-1 and a UE 100-2 that establishes a connection with an eNB 200-2. It is noted that the data path indicates a transfer route of user data (user plane).

As shown in FIG. 5, the data path of the cellular communication passes through the network. Specifically, the data path is set to pass through the eNB 200-1, the S-GW 300, and the eNB 200-2.

Figure 6:
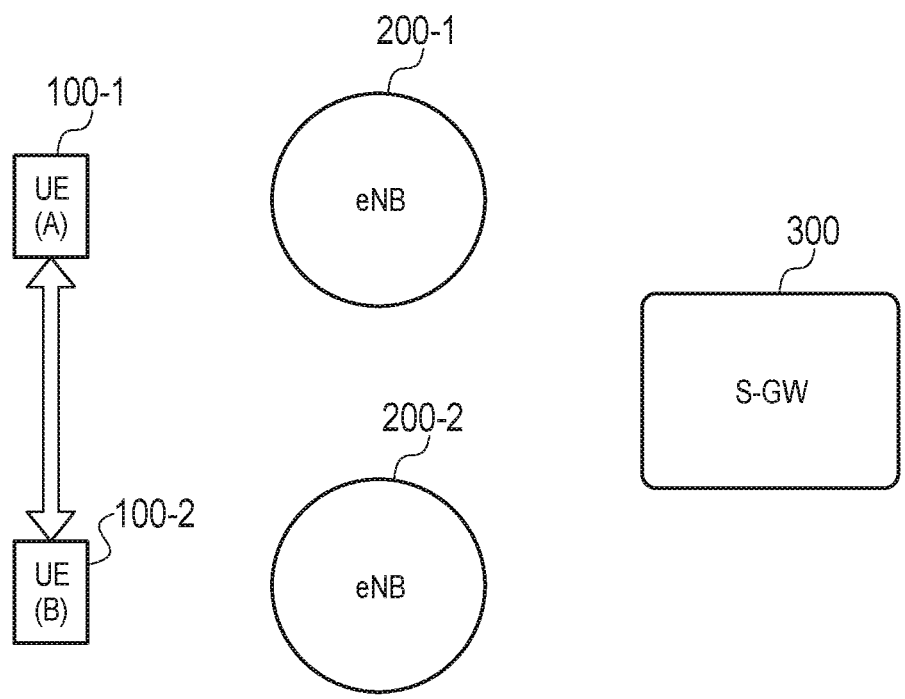
FIG. 6 is a diagram showing a data path in D2D communication.

FIG. 6 is a diagram showing a data path in the D2D communication. Here, a case is shown as an example in which the D2D communication is performed between the UE 100-1 that establishes a connection with the eNB 200-1 and the UE 100-2 that establishes a connection with the eNB 200-2.

For example, as a result of one UE 100 of the UE 100-1 and the UE 100-2 discovering the another UE 100 present in the vicinity of the one UE 100, D2D communication is started. It is noted that in order to start the D2D communication, the UE 100 has a (Discover) function of discovering the another UE 100 present in the vicinity of the UE 100. Furthermore, the UE 100 has a (Discoverable) function of being discovered by the another UE 100.

As shown in FIG. 6, the data path of the D2D communication does not pass through the network. That is, direct radio communication is performed between the UEs. As described above, when the UE 100-2 is present in the vicinity of the UE 100-1, the D2D communication is performed between the UE 100-1 and the UE 100-2, thereby obtaining an effect that a traffic load on the network and a battery consumption amount in the UE 100 are reduced, for example.

(Scheduling UE)

Figure 7:
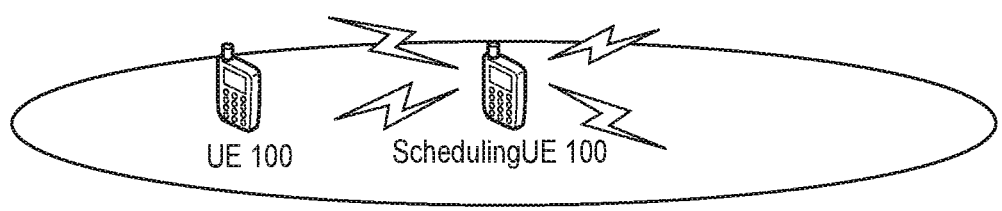
FIG. 7 is an explanatory diagram for describing a situation where a scheduling UE 100 according to the present embodiment broadcasts a message including identification information.
Figure 8:
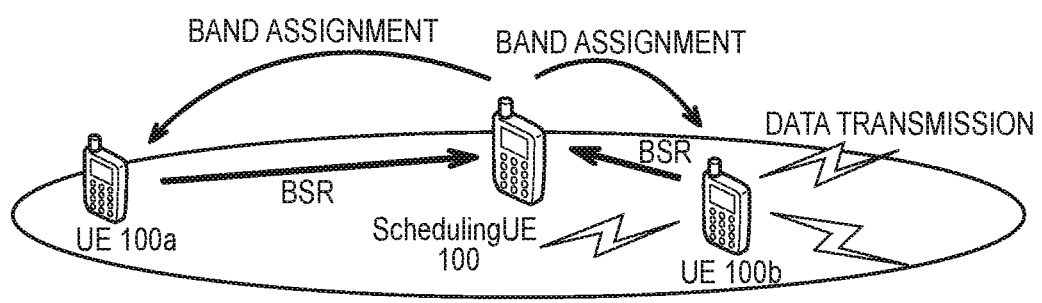
FIG. 8 is an explanatory diagram for describing a situation where the scheduling UE 100 according to the present embodiment performs scheduling.
Figure 9:
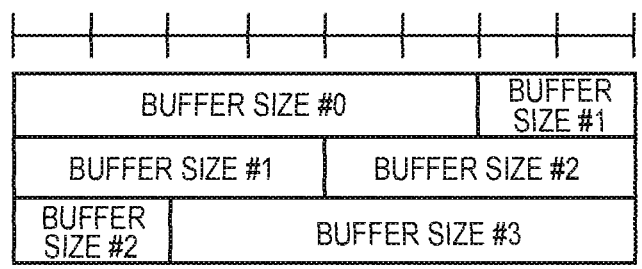
FIG. 9 is an explanatory diagram for describing a buffer state report according to the present embodiment.

Next, the scheduling UE 100 according to the present embodiment will be described by using FIG. 7 to FIG. 9. FIG. 7 is an explanatory diagram for describing a situation where the scheduling UE 100 according to the present embodiment broadcasts a message including identification information. FIG. 8 is an explanatory diagram for describing a situation where the scheduling UE 100 according to the present embodiment performs scheduling. FIG. 9 is an explanatory diagram for describing a buffer state report according to the present embodiment.

The scheduling UE 100 has a scheduling function of assigning the radio resource used for the D2D communication.

As shown in FIG. 7, when the scheduling function is enabled, the scheduling UE 100 broadcasts periodically or aperiodically a scheduling UE message. The scheduling UE message includes the identification information indicating that the UE 100 that transmits the message is the scheduling UE that performs the assignment of the radio resource. The identification information is an identifier unique to the UE 100 that is the scheduling UE 100.

The scheduling UE 100 may periodically broadcast, in addition to the scheduling UE message, a synchronization signal used by another UE 100 to establish synchronization with the scheduling UE 100. The synchronization signal includes identification information which is an identifier unique to the UE 100 that is the scheduling UE 100.

Further, the scheduling UE 100 performs the assignment of the radio resource on the UE 100 that establishes the connection. That is, the scheduling UE 100 manages the radio resource of the UE 100 that establishes the connection.

For example, as shown in FIG. 8, the scheduling UE 100 receives a buffer state report (BSR) indicating an amount of untransmitted data from each of a UE 100a and a UE 100b that establish the connection. The scheduling UE 100 assigns the radio resource to each of the UE 100a and the UE 100b, in accordance with the received buffer state report.

Further, each UE 100 (the UE 100a and the UE 100b) may classify the untransmitted data into a plurality of logical channel groups (LCG#0 to 3, for example) different in priority. Each UE 100 classifies the untransmitted data into a logical channel group having a predefined purpose, depending on a type of untransmitted data. For example, the untransmitted data may be classified by associating a purpose of use (that is, an application) with the logical channel group. Specifically, for example, untransmitted data of real-time communication (sound) may be classified as LCG#0, untransmitted data of real-time communication (image) may be classified as LCG#1, untransmitted data of data communication (text) may be classified as LCG#2, and untransmitted data of data communication (other) may be classified as LCG#3.

It is noted that the priority is previously defined for each logical channel group. For example, as shown in FIG. 9, the LCG#0 has the highest priority, and the priority decreases in the order of LCG#1, LCG#2, and LCG#3.

As shown in FIG. 9, each UE 100 creates the buffer state report indicating an amount of untransmitted data of each of the plurality of logical channel groups. The buffer state report in this case indicates an amount of untransmitted data (Buffer Size #0 to 3) corresponding to each logical channel group.

The scheduling UE 100 assigns, depending on the priority based on the buffer state report, the radio resource used by the UE 100 that transmits the buffer state report, to transmit the untransmitted data. The scheduling UE 100 transmits, to each UE 100, a band assignment indicating the assigned radio resource. The scheduling UE 100 may transmit the band assignment by unicast or by broadcast, and the scheduling UE 100 may transmit by a group cast to a group including a UE 100 that performs the assignment of the radio resource.

It is noted that the scheduling UE 100 may use previously defined Modulation and Channel Coding Scheme (MCS) to transmit the band assignment.

Further, the scheduling UE 100 may not perform a retransmission process of retransmitting the band assignment (that is, an HARQ retransmission process in a MAC layer) based on a retransmission request (that is, a negative acknowledgment (NAK) in receiving the band assignment) from the UE 100. Instead of performing the retransmission process, in order to improve an error tolerance, the scheduling UE 100 may repeatedly transmit the band assignment depending on the request from the UE 100 and the type of a communication scheme between the scheduling UE 100 and the UE 100. For example, the scheduling UE 100 may repeatedly transmit the band assignment without receiving the request from the UE 100 when the communication scheme is a broadcast scheme or a group cast scheme.

(Search for Scheduling UE 100)

Figure 10:
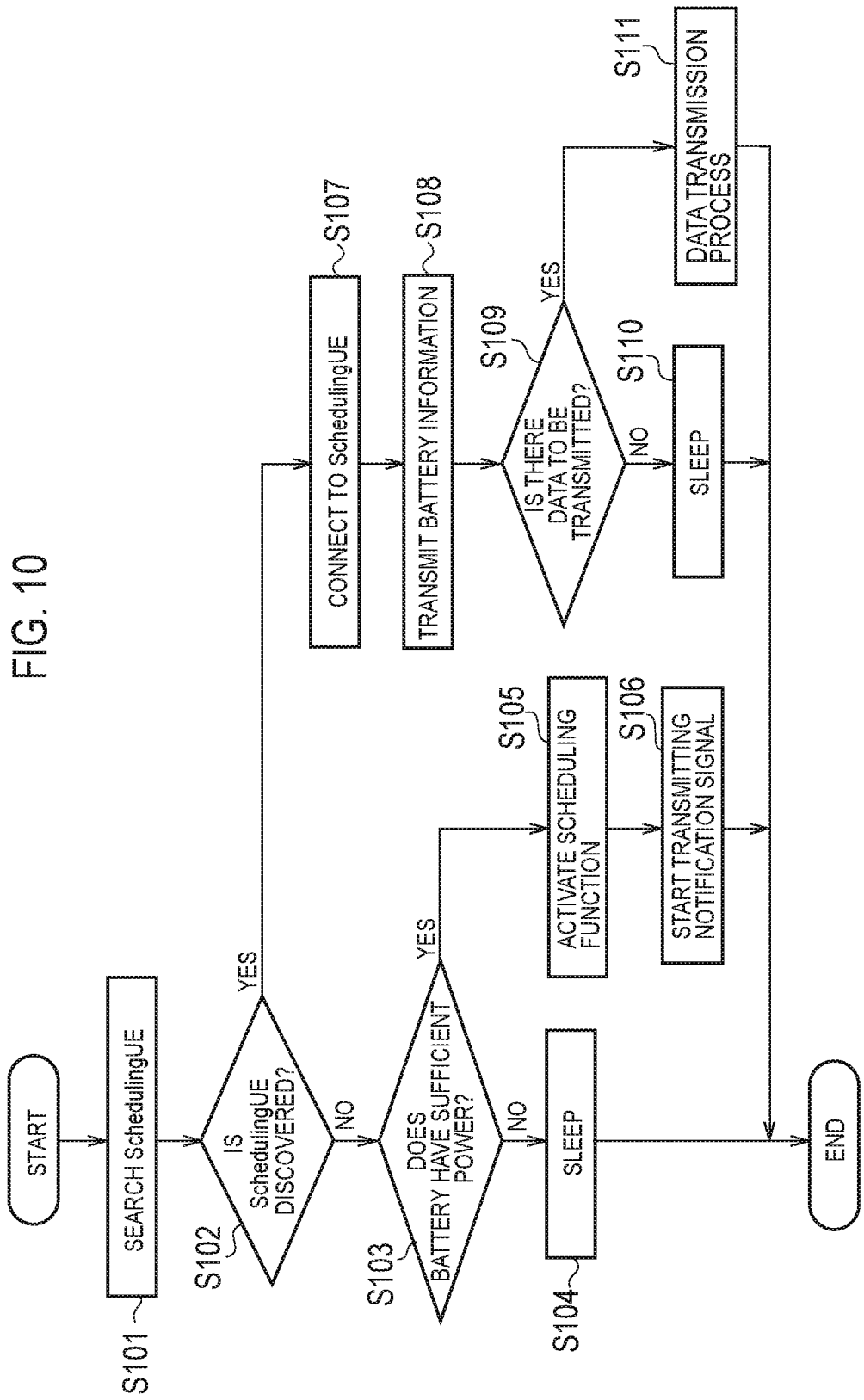
FIG. 10 is a flowchart for describing an operation of the UE 100 according to the present embodiment.
Figure 11:
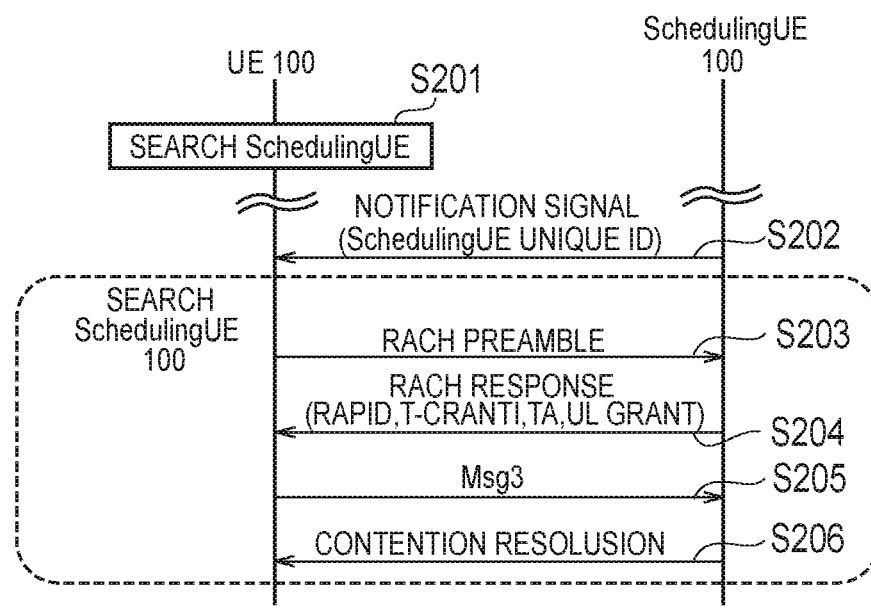
FIG. 11 is a sequence chart showing an operation example in which the UE 100 according to the present embodiment connects to a scheduling UE 100.

Next, search for the scheduling UE 100 according to the present embodiment will be described by using FIG. 10 and FIG. 11. FIG. 10 is a flowchart for describing the operation of the UE 100 according to the present embodiment. FIG. 11 is a sequence chart showing an operation example in which the UE 100 according to the present embodiment connects to the scheduling UE 100.

As shown in FIG. 10, in step S101, the UE 100 searches the scheduling UE 100. Specifically, the UE 100 searches a signal including the above-described scheduling UE message.

It is noted that when determining to be in a so-called public safety situation where the UE 100, instead of the network, is capable of performing the assignment of the radio resource, the UE 100 starts searching the scheduling UE 100.

The UE 100 determines to be in a so-called public safety situation when not receiving the signal from the eNB 200 for a predetermined period, when receiving a notification with an indication of being in a public safety situation from the eNB 200, or when a predetermined period passes since receiving an emergency warning from the eNB 200, for example.

In step S102, the UE 100 determines whether or not the scheduling UE 100 is discovered. Specifically, the UE 100 determines that the scheduling UE 100 is not discovered when not detecting a signal including the scheduling UE message (hereinafter, "notification signal", where necessary) (when "NO"), and executes a process of step S103. On the other hand, the UE 100 determines that the scheduling UE 100 is discovered when detecting the signal including the scheduling UE message (when "YES"), and executes a process of step S107.

In step S103, the UE 100 determines whether or not the battery still has sufficient power. Specifically, the UE 100 determines whether or not a battery remaining amount exceeds a threshold value. The UE 100 executes a process of step S104 when the battery remaining amount is equal to or less than the threshold value, that is, when the battery remaining amount is little (when "NO"). On the other hand, the UE 100 executes a process of step S105 when the battery remaining amount exceeds the threshold value, that is, when the battery remaining amount is much (when "YES").

In step S104, the UE 100 enters a sleep mode. Specifically, the UE 100 performs a discontinuous reception in which the radio transceiver 110 is discontinuously activated. That is, the UE 100 periodically stops supplying power to the radio transceiver 110.

On the other hand, in step S105, the UE 100 activates the scheduling function when the battery remaining amount exceeds the threshold value in step S103. This enables the scheduling function of the UE 100.

It is noted that when not including the scheduling function, the UE 100 is not capable of executing the process of step S105, and thus, the UE 100 ends the operation.

In step S106, the UE 100 starts transmitting a notification signal.

On the other hand, in step S107, when detecting the notification signal in step S102, the UE 100 establishes at least the synchronization with the scheduling UE 100. In the present embodiment, the UE 100 establishes, in addition to establishing the synchronization, establishes a connection with the scheduling UE 100. The establishment of the connection between the UE 100 and the scheduling UE 100 will be described in detail later.

It is noted that when not establishing the connection with the scheduling UE 100 but only establishing the synchronization, the UE 100 establishes the synchronization of the radio link in a direction of the UE 100 from the scheduling UE 100 by using the notification signal or the synchronization signal transmitted from the scheduling UE 100.

In step S108, the UE 100 transmits battery information indicating a state of a battery, to the scheduling UE 100. The battery information is information indicating a battery remaining amount, a battery usage rate, or an amount of battery to be used, for example. The scheduling UE 100 determines, on the basis of the battery information, the UE 100 that is requested to become the scheduling UE 100, as described later.

In step S109, the UE 100 determines whether or not to have user data to be transmitted to the another UE 100. The UE 100 executes a process of step S110 when not having the user data (when "NO"). On the other hand, the UE 100 executes the process of step S111 when having the user data.

It is noted that the UE 100 may execute the process of step S110 when having neither the user data to be transmitted nor user data to be received.

In step S110, the UE 100 enters the sleep mode in a state of at least establishing the synchronization with the scheduling UE 100. While establishing the connection with the scheduling UE 100, the UE 100 may enter the sleep mode at the same time.

On the other hand, in step S111, the UE 100 executes a process of transmitting the user data. Specifically, the UE 100 receives, from the scheduling UE 100, the band assignment that is the assignment information of the radio resource. It is noted that in order to be assigned with the radio resource, the UE 100 may request the assignment of the radio resource to the scheduling UE 100.

The UE 100 recognizes, on the basis of the band assignment, the radio resource used for transmitting the user data assigned to the UE 100, and transmits the user data to the another UE 100 by using the radio resource.

It is noted that the UE 100 establishes the connection for each communication group that exchanges the user data. For the connection and the D2D communication, the UE 100 may perform the connection and the D2D communication by a previously defined setting or may newly define a setting between the UEs 100 configuring the communication group. Further, the UE 100 configuring each communication group may define a protocol (for example, an encryption technology such as an encryption scheme and an encryption key) specific to a group. This enables a different communication group to coexist.

(Connection with Scheduling UE 100)

Next, the connection of the UE 100 with the scheduling UE 100 will be described by using FIG. 11. FIG. 11 is a sequence chart for describing the connection between the UE 100 according to the present embodiment and the scheduling UE 100.

As shown in FIG. 11, in step S201, the UE 100 searches the scheduling UE 100.

In step S202, the scheduling UE 100 transmits the notification signal (broadcast signal) including the scheduling UE message. The UE 100 receives the notification signal. As a result of the notification signal being received, the UE 100 discovers (detects) the scheduling UE 100. It is noted that the scheduling UE message includes, as the identification information, an identifier (Scheduling UE unique ID) unique to the UE 100 that is the scheduling UE 100.

In step S203, when detecting the scheduling UE 100, the UE 100 starts a random access procedure for establishing the connection with the scheduling UE 100. Specifically, the UE 100 transmits the random access preamble (RACH preamble) to the detected scheduling UE 100. The scheduling UE 100 receives the random access preamble. The scheduling UE 100 estimates a transmission timing from the UE 100, on the basis of reception of the random access preamble.

In step S204, the scheduling UE 100 transmits, to the UE 100, a random access response (RACH Response) that is a response to the random access preamble. The UE 100 receives the random access response.

The random access response includes a random access preamble identifier (RAPID), a temporary identifier (RNTI), a timing correction value (TA), and a scheduling grant (UL Grant).

The random access preamble identifier (RAPID) is an identifier for specifying the random access preamble received by the scheduling UE 100.

The temporary identifier (RNTI) is a temporary identifier used for the D2D communication between the UE 100 and the scheduling UE 100. It is noted that the random access response may include, as the temporary identifier, a plurality of types of identifiers (Temporary D2DRNTIs) used for the D2D communication. The plurality of types of identifiers may include, for example, a plurality of identifiers according to a type of information to be transmitted such as a temporary identifier used for transmitting the user data and a temporary identifier used for transmitting control information (for example, the band assignment) and a plurality of identifiers according to a type of communication scheme such as a unicast and a group cast. The scheduling UE 100 uses the temporary identifier in order to transmit the radio resource assigned to the UE 100, for example.

The timing correction value (TA) is a correction value for correcting a transmission timing from the UE 100 estimated by the scheduling UE 100 in step S203. The UE 100 corrects the transmission timing on the basis of the timing correction value in order to establish the synchronization in a direction of the scheduling UE 100 from the UE 100.

The scheduling grant (UL Grant) is assignment information of the radio resource used by the UE 100 to transmit a message (Msg3) to the scheduling UE 100 in step S205.

In step S205, the UE 100 transmits, to the scheduling UE 100, the message (Msg3) for establishing the connection with the scheduling UE 100. The scheduling UE 100 establishes the connection with the UE 100, on the basis of the received message. The message includes, for example, a request of a connection in the RRC layer (hereinafter, "RRC connection", where necessary) and the identifier of the UE 100.

It is noted that when performing the RRC connection with the scheduling UE 100 and there is a setting value for the RRC connection previously defined for the D2D communication, the UE 100 may omit the transmission of the information for the RRC connection. The scheduling UE 100 and the UE 100 performs the setting of the RRC connection, on the basis of the defined setting value.

In step S206, the scheduling UE 100 transmits, to the UE 100, a contention resolution message (Contention Resolution) used for determining whether or not the random access procedure is successful. The UE 100 receives the contention resolution message. The contention resolution message includes the message transmitted by the UE 100 and the identifier of the UE 100 transmitted in step S205.

The UE 100 compares the identifier of the UE 100 included in the contention resolution message with the identifier of the UE 100 transmitted in step S205. Further, the UE 100 compares another information included in the message included in the contention resolution message and another information included in the message transmitted in step S205. When the identifier of the UE 100 and the another information match as a result of the comparison, the UE 100 determines that the random access procedure is successful. On the another hand, when these pieces of information do not match, the UE 100 determines that the random access procedure is failed. When determining that the random access procedure is failed, the UE 100 starts again the random access procedure.

It is noted that the scheduling UE 100 may omit the transmission of the contention resolution message. For example, the scheduling UE 100 may omit the transmission of the contention resolution message in accordance with the number of UEs 100 that perform the assignment of the radio resource. When the number of the UEs 100 exceeds a threshold value, the scheduling UE 100 omits the transmission of the contention resolution message to the UE 100 that newly starts the random access procedure.

Between the UE 100 and the scheduling UE 100, the UE 100 may not establish the connection in the MAC layer and the RRC layer but only may establish the connection only in a PHY layer. After establishing the connection in the PHY layer, the UE 100 starts standing by for a message in the PHY layer from the scheduling UE 100. When the scheduling UE 100 transmits the message in the PHY by broadcast or group cast, the UE 100 that starts the standing by is capable of receiving the message in the PHY.

(Reception of Signal from Another UE 100)

Next, a case where the scheduling UE 100 or the UE 100 to which the radio resource is assigned from the scheduling UE 100 receives the signal from another UE 100 will be described by using FIG. 12 to FIG. 17.

(1) Case 1A

Figure 12:
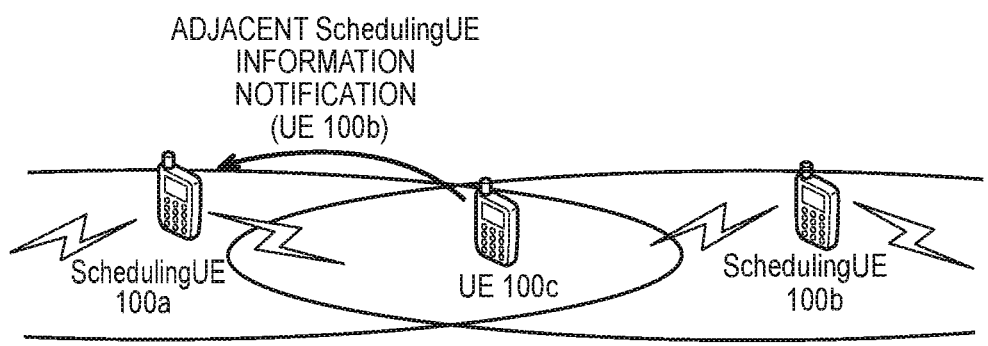
FIG. 12 is an explanatory diagram for describing an operation environment of a case 1A in receiving a signal from another UE 100.
Figure 13:
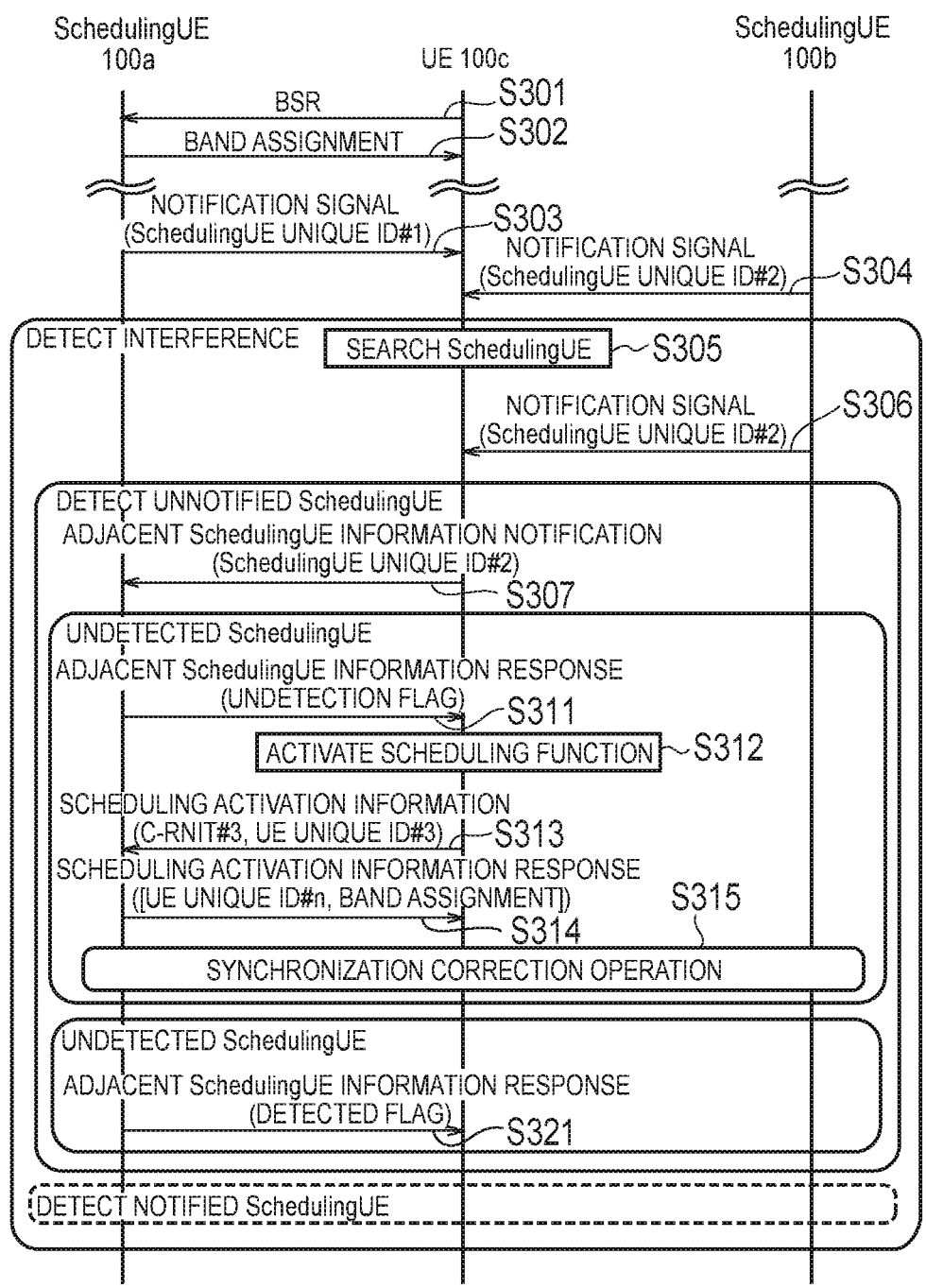
FIG. 13 is a sequence chart for describing an operation of the case 1A in receiving a signal from another UE 100.
Figure 14:
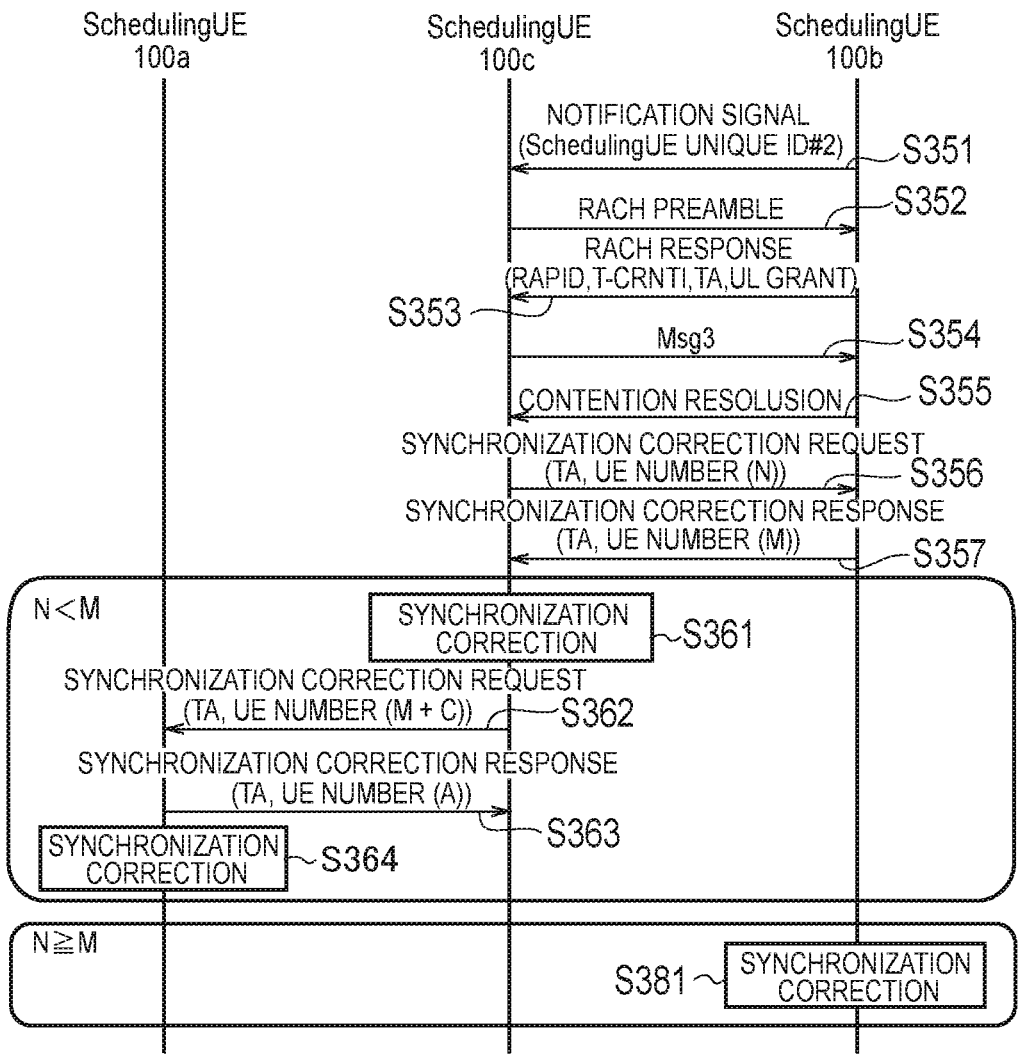
FIG. 14 is a sequence chart for describing an operation of the case 1A in receiving a signal from another UE 100.
Figure 15:
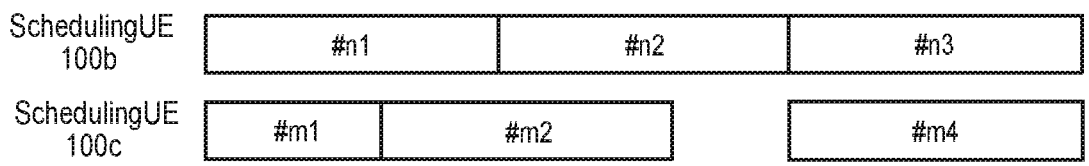
FIG. 15 is an explanatory diagram for describing a synchronization correction operation according to an embodiment.

A case 1A is a case where the scheduling UE 100 or the UE 100 assigned with the radio resource from the scheduling UE 100 receives the notification signal from another scheduling UE 100. The case 1A will be described using FIG. 12 to FIG. 17. FIG. 12 is an explanatory diagram for describing an operation environment of the case 1A in a mobile communication system according to the embodiment. FIG. 13 and FIG. 14 are sequence charts for describing an operation of the case 1A in the mobile communication system according to the embodiment. FIG. 15 is an explanatory diagram for describing a synchronization correction operation according to the embodiment.

As shown in FIG. 12, there are a scheduling UE 100*a*, a scheduling UE 100*b*, and a UE 100*c* assigned with the radio resource from the scheduling UE 100*a*. The scheduling UE 100*b* is adjacent to the UE 100*c*, and in the scheduling UE 100*b*, the assignment of the radio resource from the scheduling UE 100*a* is not managed.

After establishing the connection with the scheduling UE 100*a*, the UE 100*c* stops searching the scheduling UE 100.

In such an operation environment, each UE 100 performs the following operation.

Firstly, as shown in FIG. 13, in step S301, the UE 100*c* transmits the buffer state report to the scheduling UE 100*a*. The scheduling UE 100*a* receives the buffer state report.

In step S302, the scheduling UE 100*a* transmits the band assignment to the UE 100*c*, on the basis of the buffer state report. The UE 100*c* receives the band assignment.

In step S303, the scheduling UE 100*a* transmits a notification signal including an identifier unique to the scheduling UE 100*a* (Scheduling UE unique ID#1).

In step S304, the scheduling UE 100*b* transmits, similarly to step S303, a notification signal including an identifier unique to the scheduling UE 100*b* (Scheduling UE unique ID#2). The UE 100*c* determines that the interference is detected by the notification signal from the scheduling UE 100*b*. For example, when not being capable of receiving the user data from the scheduling UE 100*a*, the UE 100*c* determines that the interference is detected.

In step S305, when detecting the interference, the UE 100*c* resumes searching the scheduling UE 100.

In step S306, the scheduling UE 100*b* transmits, similarly to step S304, a notification signal including an identifier unique to the scheduling UE 100*b* (Scheduling UE unique ID#2). As a result of the searching for the scheduling UE 100, the UE 100*c* receives the notification signal from the scheduling UE 100*b*.

When detecting the scheduling UE 100 not notified to the scheduling UE 100*a*, the UE 100*c* executes a process of step S307. On the other hand, when detecting the scheduling UE 100 notified to the scheduling UE 100*a*, the UE 100*c* ends the process. Further, when receiving the notification signal from the scheduling UE 100*a* also, the UE 100*c* ends the process.

When detecting the scheduling UE 100 from which the interference originates, the UE 100*c* may again stop searching the scheduling UE 100.

As shown in FIG. 12 and FIG. 13, in step S307, when detecting the scheduling UE 100 not notified to the scheduling UE 100*a*, the UE 100*c* notifies the scheduling UE 100*a* of adjacent scheduling UE information. The scheduling UE 100*a* receives the adjacent scheduling UE information.

The adjacent scheduling UE information is information indicating that the notification signal is detected from the scheduling UE 100 not assigned with the radio resource. The adjacent scheduling UE information includes an identifier unique to the scheduling UE 100*b* (Scheduling UE unique ID#2) included in the received notification signal.

When determining that the scheduling UE 100*b* notified from the UE 100*c* is an undetected scheduling UE 100, the scheduling UE 100*a* executes a process of step S311. On the another hand, when determining that the scheduling UE 100*b* is a detected scheduling UE 100, the scheduling UE 100*a* executes a process of step S321. It is noted that the scheduling UE 100*a* makes a determination on the basis of the identifier included in the adjacent scheduling UE information.

In step S311, the scheduling UE 100*a* transmits, to the UE 100*c*, an adjacent scheduling UE information response including an undetection flag indicating that the scheduling UE 100*b* is undetected. The UE 100*c* receives the adjacent scheduling UE information response.

In step S312, when receiving the adjacent scheduling UE information including the undetection flag, the UE 100*c* activates the scheduling function.

In step S313, the UE 100*c* transmits, to the scheduling UE 100*a*, scheduling activation information indicating that the scheduling function is activated. The scheduling UE 100*a* receives the scheduling activation information.

The scheduling activation information includes a temporary identifier (C-RNTI#3) and an identifier (UE unique ID#3) unique to the UE 100*c*. The scheduling UE 100*a* is capable of knowing that as an adjacent scheduling UE, the UE 100*c* having the C-RNTI#3 and the UE unique ID#3 is activated. It is noted that the temporary identifier may be used, for example, for a scramble for CRC (Cyclic Redundancy Check) added to control information.

In step S314, the scheduling UE 100*a* transmits, to the scheduling UE 100*c*, a scheduling activation information response. The scheduling UE 100*c* receives the scheduling activation information response.

When determining to share the control, with the scheduling UE 100c, of the UE 100 assigned with the radio resource, the scheduling UE 100a divides the assignable radio resource. The scheduling UE 100a transmits, to the scheduling UE 100c, an identifier (UE unique ID#n) indicating each scheduling UE 100 and the assignment information (band assignment) of the radio resource assignable by each scheduling UE 100. In the present embodiment, the identifiers indicating each scheduling UE 100 are the UE unique #1 indicating the scheduling UE 100a and the UE unique #3 indicating the scheduling UE 100c. Further, the assignment information of the radio resource is a band assignment of each of the scheduling UE 100a and the scheduling UE 100c. It is noted that the scheduling UE 100a may transmit only the band assignment of the scheduling UE 100c instead of the identifier indicating each scheduling UE 100 and the assignment information of the radio resource.

In step S315, each scheduling UE 100 (the UE 100a, the UE 100b, and the UE 100c) performs the synchronization correction operation. The synchronization correction operation will be described later.

On the other hand, in step S321, when determining that the scheduling UE 100b is the detected scheduling UE 100, the scheduling UE 100a transmits, to the UE 100c, the adjacent scheduling UE information response including a detected flag indicating that the scheduling UE 100b has been detected. The UE 100c receives the adjacent scheduling UE information response.

When receiving the adjacent scheduling UE information response including the detected flag, the scheduling UE 100c may stop again searching the scheduling UE 100.

Next, the synchronization correction operation in the above-described step S315 will be described by using FIG. 14.

As shown in FIG. 14, steps S351 to S355 correspond to steps S202 to S206 in FIG. 11.

The scheduling UE 100c determines, by the random access procedure from steps S352 to S355, that the synchronization timing with the scheduling UE 100b is deviated for the D2D communication. When determining that the synchronization timing is deviated, the scheduling UE 100c executes a process of step S356 in order to perform correction for aligning the synchronization timing.

In step S356, the scheduling UE 100c transmits a synchronization correction request for aligning the synchronization timing to the scheduling UE 100b. The scheduling UE 100b receives the synchronization correction request.

The synchronization correction request includes, as an index for determining a timing correction value (TA) in a direction from the scheduling UE 100b to the scheduling UE 100c and a subject on which a synchronization correction is performed, the number of UEs subordinate to the scheduling UEs 100 having the same synchronization timing.

It is noted that as the number of UEs that is the index, the number of scheduling UEs 100 having the same synchronization timing may be used, and the number of UEs subordinate to the scheduling UE 100 itself that transmits the synchronization correction request may be used. Depending on the magnitude of the number of UEs that is the index, the subject on which the synchronization correction is performed is determined. Further, as the index, an ID unique to the scheduling UE 100 may be used. In this case, depending on the magnitude of the unique ID, the subject on which the synchronization correction is performed is determined.

It is noted that depending on a combination of the above indexes, the subject on which the synchronization correction is performed may be determined.

Further, information that is the above-described index may be requested to another scheduling UE 100 when each scheduling UE 100 provides the synchronization correction request, and information that is the index may be periodically received. Further, when the index is updated, the scheduling UE 100 may transmit the information that is the index.

In the present embodiment, the scheduling UE 100 having a smaller number of UEs that are the indexes performs the synchronization correction. Further, in the present embodiment, description proceeds with an assumption that the scheduling UE 100a and the scheduling UE 100c are the same in synchronization timing.

A denotes the number of UEs subordinate to the scheduling UE 100a, C denotes the number of UEs subordinate to the scheduling UE 100c, and a total number of the UEs is N(=A+C). On the other hand, the number of UEs subordinate to the scheduling UE 100b is M.

In step S357, the scheduling UE 100b transmits a synchronization correction response, as a response to the synchronization correction request, to the scheduling UE 100c. The scheduling UE 100c receives the synchronization correction response.

The synchronization correction response includes, the timing correction value (TA) in the direction from the scheduling UE 100c to the scheduling UE 100b and, similarly to step S356, the number of UEs subordinate to the scheduling UEs 100 having the same synchronization timing.

In the present embodiment, the scheduling UE 100b does not establish the synchronization with another scheduling UE 100, and has M, as the number of UEs subordinate to the scheduling UE 100b.

Here, when M is larger than N (N<M), a process of step S361 is executed. On the other hand, when M is equal to or smaller than N (N≥M), a process of step S381 is executed.

In step S361, the scheduling UE 100c has a smaller number of UEs subordinate to the scheduling UEs 100 having the same synchronization timing than the scheduling UE 100b, and thus, the scheduling UE 100c performs the synchronization correction on the basis of a timing correction value in step S356 and S357.

As shown in FIG. 15, in order to align the synchronization timing, the scheduling UE 100c may not set a subframe #m2 that is a predetermined subframe of the scheduling UE 100c but may match a head of a subframe #m3 that is a next subframe with a head of a subframe #n3 of the scheduling UE 100b.

Further, the scheduling UE 100c may transmit an indication that the synchronization timing is aligned, to the subordinate UE 100. The scheduling UE 100c may transmit, together with the notification, the timing correction value.

In step S362, similarly to step S356, the scheduling UE 100c transmits the synchronization correction request to the scheduling UE 100a. The scheduling UE 100a receives the synchronization correction request. It is noted that the number of UEs subordinate to the scheduling UE 100 having the same synchronization timing in the scheduling UE 100c, is M+C.

In step S363, similarly to step S357, the scheduling UE 100a transmits the synchronization correction response to the scheduling UE 100c. The scheduling UE 100c receives the synchronization correction response. The scheduling UE 100c receives the synchronization correction response. It is noted that the number of UEs subordinate to the scheduling UEs 100 having the same synchronization timing in the scheduling UE 100*a*, is A.

In step S364, the UE number M+C is larger than the UE number A, and thus, similarly to step S361, the scheduling UE 100*a* performs the synchronization correction on the basis of the timing correction value in steps S362 and S363.

It is noted that when previously determining that the UE number M+C is larger than the UE number A, the scheduling UE 100*c* may omit the transmission of the UE number. In this case, the scheduling UE 100*c* may transmit a synchronization correction instruction so that the synchronization correction is performed.

Returning to FIG. 14, in step S381, the scheduling UE 100*b* has a smaller number of UEs subordinate to the scheduling UEs 100 having the same synchronization timing than the scheduling UE 100*c*, and thus, similarly to step S361, the scheduling UE 100*c* performs the synchronization correction on the basis of the timing correction value in steps S356 and S357.

(2) Case 2A

Figure 16:
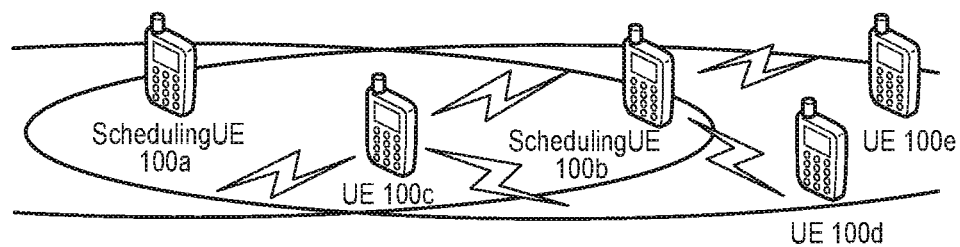
FIG. 16 is an explanatory diagram for describing an operation environment of a case 2A in receiving a signal from another UE 100.
Figure 17:
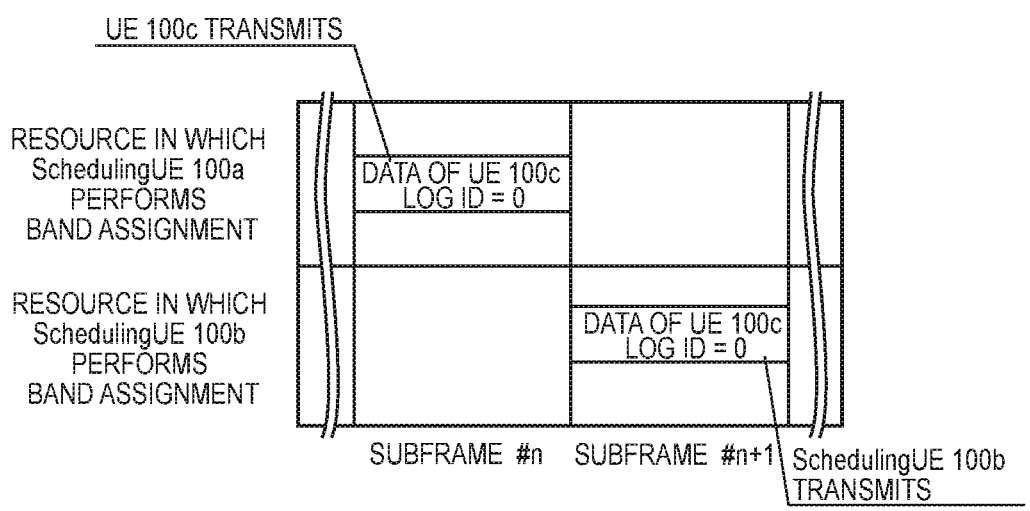
FIG. 17 is an explanatory diagram for describing a radio resource used when transmitting specific information in the case 2A in receiving the signal from the another UE 100.

A case 2A is a case where the scheduling UE 100 receives specific information from another UE 100 that does not manage the radio resource. The case 2A will be described by using FIG. 16 and FIG. 17. FIG. 16 is an explanatory diagram for describing an operation environment of the case 2A in the mobile communication system according to the embodiment. FIG. 17 is an explanatory diagram for describing a radio resource used when transmitting the specific information in the case 2A in the mobile communication system according to the embodiment.

As shown in FIG. 16, there are the scheduling UE 100*a*, the scheduling UE 100*b*, the UE 100*c*, a UE 100*d*, and a UE 100*e*. The scheduling UE 100*a* manages the radio resource of the UE 100*c*. On the other hand, the scheduling UE 100*b* adjacent to the scheduling UE 100*a* manages the radio resource of the UE 100*d* and the UE 100*e*.

Firstly, the UE 100*c* determines that the specific information that is set toward a specific UE 100 is broadcast. The specific information is information classified as a specific logical channel group (for example, LCG ID=0), and is information indicating emergency data, for example. The specific information is information to be transferred until the specific UE 100 receives the same.

In the present embodiment, the scheduling UE 100*a* sets aside a radio resource dedicated to transmission of the specific information (information of LCG ID=0). Specifically, as shown in FIG. 17, a predetermined region is set aside out of a frequency band with which the scheduling UE 100*a* is capable of assigning the radio resource. The scheduling UE 100*a* periodically broadcasts the information indicating the dedicated radio resource.

The UE 100*c* transmits, to the scheduling UE 100*a*, the buffer state report indicating an amount of untransmitted data classified as LCG ID=0. When the untransmitted data is classified as LCG ID=0 by the buffer state report from the UE 100*c*, the scheduling UE 100*a* assigns the dedicated radio resource. In this case, the scheduling UE 100*a* assigns the radio resource having an amount used only for transmitting the untransmitted data classified as LCG ID=0. The scheduling UE 100*a* transmits the assignment information (band assignment) of the assigned radio resource, to the UE 100*c*. The UE 100*c* uses, on the basis of the band assignment, the dedicated radio resource to transmit the specific information.

The scheduling UE 100*b* receives the specific information from the UE 100*c* that does not manage the radio resource.

As a result of receiving the information indicating the dedicated radio resource from the scheduling UE 100*a*, the scheduling UE 100*b* is capable of knowing that the received information uses a dedicated frequency region. Thus, the scheduling UE 100*b* determines that the information received from the UE 100*c* is the specific information.

It is noted that the information indicating the dedicated radio resource may be previously defined. In this case, the scheduling UE 100*b* does not receive the information indicating the dedicated radio resource but may determine that the information received from the UE 100*c* is the specific information.

Further, in order that the scheduling UE 100*b* determines whether or not the received information is the specific information, the UE 100*c* may set, to a header portion of the specific information, a flag with an indication that the received information is data to be classified as a specific logical channel group (for example, LCG ID=0). The scheduling UE 100*b* is capable of determining depending on the presence of the flag in the header portion whether or not the received information is the specific information.

When the scheduling UE 100*b* determines that the specific information is not the information toward to the scheduling UE 100*b*, the scheduling UE 100*b* determines to transfer the specific information.

It is noted that in order that the scheduling UE 100*b* determines whether or not to transfer the information, the UE 100*c* may set a unique numerical value to the header portion of the specific information. When not receiving specific information having the same numerical value as a unique numerical value set to the header portion of the received specific information (or when not receiving the same for a constant period), the scheduling UE 100*b* may determine to transfer the specific information.

For example, when the specific information does not include the identifier destined to the scheduling UE 100*b* or when the specific information cannot be compounded in the upper layer, the scheduling UE 100*b* determines that the specific information is not the information toward the scheduling UE 100*b*.

As shown in FIG. 17, similarly to the scheduling UE 100*a* the scheduling UE 100*b* broadcasts the specific information by using the dedicated radio resource.

Further, when determining that the received information is the specific information, the UE 100*d* that receives the specific information broadcasts the specific information by using the dedicated radio resource, as described above. In this way, the specific information is transferred one after another.

It is noted that in order to prevent the specific information from being piled up, when receiving the specific information from a UE 100 subordinate to each scheduling UE 100, each scheduling UE 100 may determine to not broadcast the specific information. Further, when receiving the specific information from the same UE 100 within a predetermined period, each scheduling UE 100 may determine to not broadcast the specific information. Further, when the specific information is destined to a UE 100 subordinate the scheduling UE 100, the scheduling UE 100 may not broadcast but transmit the information by unicast or group cast.

(Activation of Scheduling Function)

Next, a case where the UE 100 activates the scheduling function will be described by using FIG. 18 to FIG. 22. It is noted that description about the case in (Search for scheduling UE 100) described above will be omitted.

(1) Case 1B

Figure 18:
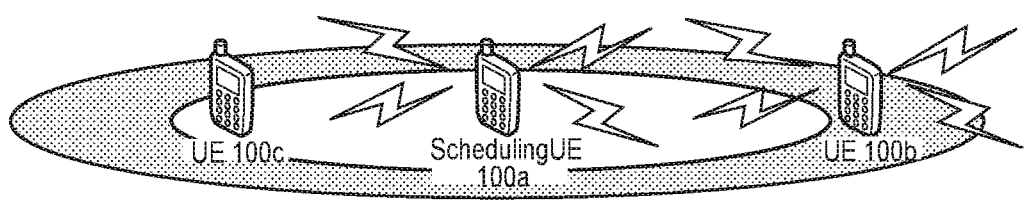
FIG. 18 is an explanatory diagram for describing an operation environment of a case 1B in activating a scheduling function.

A case 1B is a case where when a received strength that is a signal intensity of the notification signal from the scheduling UE 100 is equal to or less than a threshold value, the UE 100 subordinate to the scheduling UE 100 activates the scheduling function. The case 1B will be described by using FIG. 18 to FIG. 20. FIG. 18 is an explanatory diagram for describing an operation environment of the case 1B in the mobile communication system according to the embodiment. FIG. 19 is a sequence charts for describing an operation of the case 1B in the mobile communication system according to the embodiment. FIG. 20 is a flowchart for describing an operation of the case 1B in the mobile communication system according to the embodiment.

As shown in FIG. 18, there are the scheduling UE 100a, a UE 100b, and a UE 100c. The scheduling UE 100a manages the radio resource of the UE 100b and the UE 100c.

In such an operation environment, each UE 100 performs the following operation.

As shown in FIG. 19, in step S401, similarly to step S202 in FIG. 11, the scheduling UE 100a transmits the notification signal. The UE 100b newly detects the notification signal.

As shown in FIG. 19 and FIG. 20, in step S402 (that is step S402-1), the UE 100b newly measures a received strength Pr of the notification signal.

In step S402-2, the UE 100b determines whether the received signal Pr of the notification signal is equal to or less than a threshold value Pthresh. The UE 100b ends the process when the received strength Pr is larger than the threshold value Pthresh (when "NO"). On the other hand, the UE 100b executes a process of step S403 when the received strength Pr is equal to or less than the threshold value Pthresh (when "YES").

Step S403 corresponds to step S312 in FIG. 13. Specifically, the UE 100b is activated as the scheduling UE. That is, the UE 100b activates the scheduling function to enable the scheduling function.

Steps S404 and S405 correspond to steps S313 and S314 in FIG. 13.

In step S406, the scheduling UE 100b transmits a notification signal including an identifier unique to the scheduling UE 100b (Scheduling UE unique ID#2).

(2) Case 2B

Figure 21:
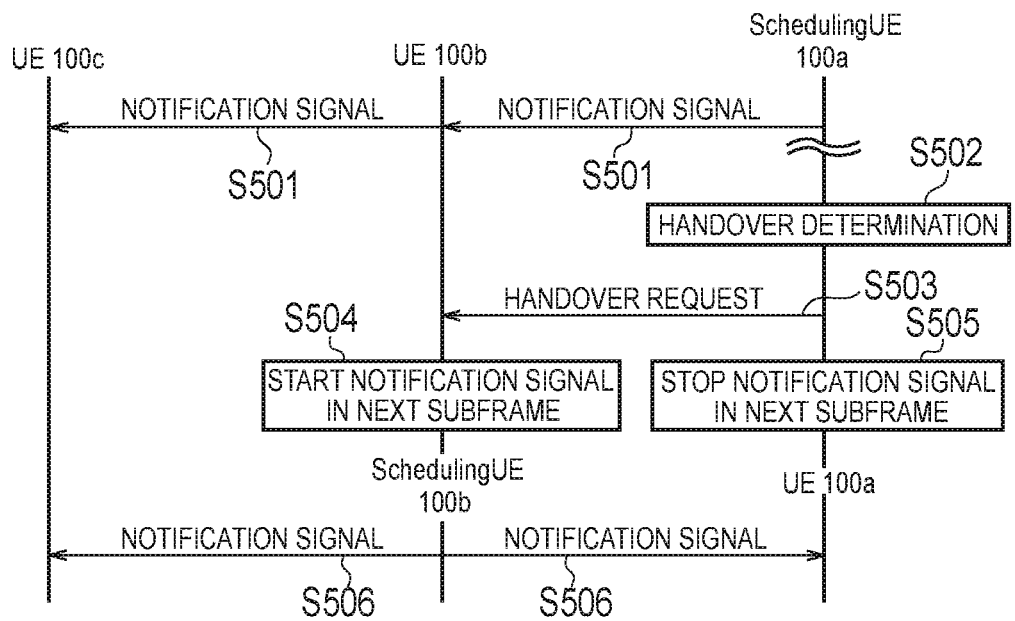
FIG. 21 is a sequence chart for describing an operation of a case 2B in activating a scheduling function.
Figure 22:
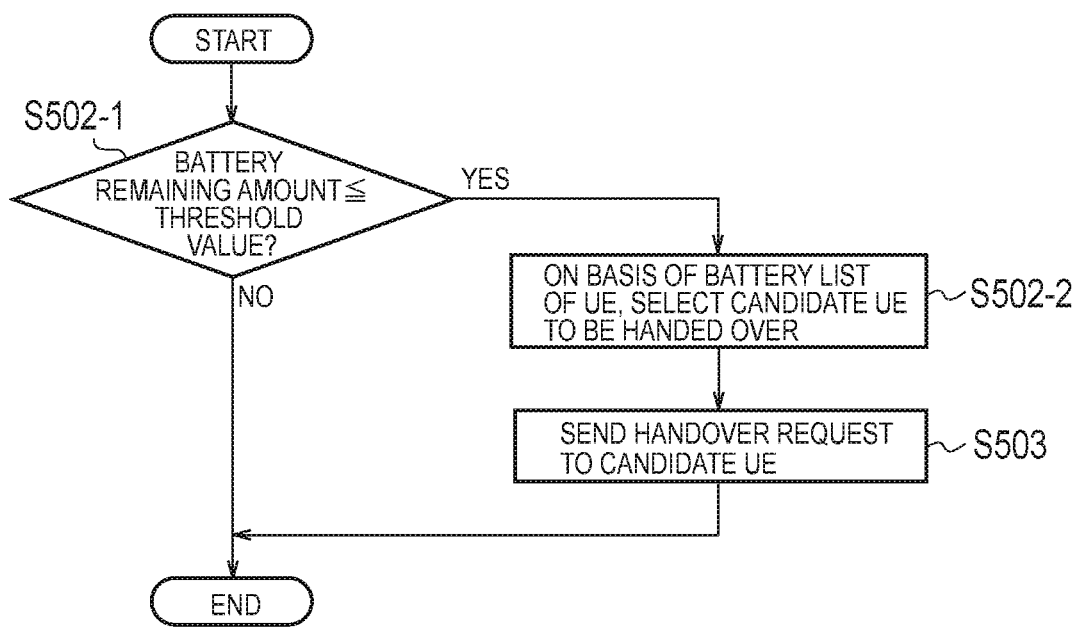
FIG. 22 is a flowchart for describing an operation of the case 2B in activating the scheduling function.

A case 2B is a case where the UE 100 activates the scheduling function by reception of a handover request from the scheduling UE 100. The case 2B will be described by using FIG. 21 and FIG. 22. FIG. 21 is a sequence chart for describing an operation of the case 2B in the mobile communication system according to the embodiment. FIG. 22 is a flowchart for describing an operation of the case 2B in the mobile communication system according to the embodiment.

The operation environment in the case 2B is an operation environment similar to in the above-described case 1B.

As shown in FIG. 21, in step S501, similarly to step S202 in FIG. 11, the scheduling UE 100a transmits the notification signal.

In step S502, the scheduling UE 100a makes a handover determination. Specifically, the scheduling UE 100a determines whether or not to handover a role of the assignment of the radio resource (hereinafter, "scheduling role", where necessary), to another UE 100.

As shown in FIG. 22, in step S502-1, the scheduling UE 100a determines whether or not a battery remaining amount of the scheduling UE 100a is equal to or less than a threshold value. When the battery remaining amount is not equal to or less than a threshold value (when "NO"), the scheduling UE 100a continues to perform the assignment of the radio resource. On the other hand, when the battery remaining amount is equal to or less than a threshold value (when "YES"), the scheduling UE 100a executes a process of step S502-2.

In step S502-2, the scheduling UE 100a selects, on the basis of a battery list of the UE 100, a candidate UE 100 to which the scheduling role is handed over.

The scheduling UE 100a receives the battery information as described in step S108 of FIG. 10 described above. The scheduling UE 100a creates the battery list on the basis of the received battery information. The battery list includes information such as identification information of the UE 100, a battery remaining amount indicated in the battery information, a registration time to the battery list, and an estimated value of the battery remaining amount, for example. The scheduling UE 100a determines the estimated value of the battery remaining amount on the basis of a situation of the assignment of the radio resource, for example.

For example, on the basis of the estimated value of the battery remaining amount, the scheduling UE 100a selects, as a candidate UE 100, the UE 100 having the largest battery remaining amount after a constant time period. In the present embodiment, description proceeds with an assumption that the UE 100b is selected as a candidate.

As shown in FIG. 21 and FIG. 22, in step S503, the scheduling UE 100a transmits the handover request to the candidate UE 100b. The UE 100b receives the handover request. The UE 100b that receives the handover request activates the scheduling function.

The handover request is to request the candidate UE 100b to act as the scheduling UE instead of the scheduling UE 100a. The scheduling UE 100a may transmit, together with the handover request, information on the UE 100 for which the radio resource is managed by the scheduling UE 100a. Further, the scheduling UE 100a may transmit, together with the handover request, information indicating a timing at which a transmission target of the notification signal, described later, is switched.

In step S504, the UE 100b determines to start transmitting the notification signal from a subframe next to a subframe in which the handover request is received.

In step S505, the scheduling UE 100a determines to stop transmitting the notification signal from the subframe next to the subframe in which the UE 100b receives the handover request.

In step S506, the UE 100b (that is, the current scheduling UE 100b) starts transmitting the notification signal. On the other hand, the UE 100a (that is, the previous scheduling UE 100a) stops transmitting the notification signal in timing with starting transmitting the notification signal by the UE 100b. As a result, the transmission target of the notification signal is switched with good timing.

(Summary of Embodiment)

In the present embodiment, when the scheduling function is enabled, the UE 100 broadcasts periodically or aperiodically a scheduling UE message including the identification information indicating that the UE 100 is a scheduling UE 100. Thus, UEs 100 present around the scheduling UE 100 are capable of discovering a scheduling UE 100 that performs the assignment of the radio resource. Therefore, when the scheduling UE 100 represents the plurality of UEs 100 to perform the assignment of the radio resource, it is possible to restrain overlapping the radio resources.

Further, when detecting the notification signal including the scheduling UE message by the searching for the scheduling UE 100, the UE 100 establishes at least the synchronization with the scheduling UE 100 that broadcasts the scheduling UE message. Thus, when the synchronization timing is deviated between the UE 100 and the scheduling UE 100, it is possible to restrain occurrence of a reception failure such as the broadcast information between the UE 100 and the scheduling UE 100.

Further, the UE 100 uses the notification signal or the synchronization signal transmitted from the scheduling UE 100 to establish the synchronization with the scheduling UE 100. Thus, even when a network situation is unstable, it is possible to establish the synchronization.

Further, the UE 100 establishes, in addition to establishing the synchronization, the connection with the scheduling UE 100. This enables the UE 100 to be assigned with the radio resource from the scheduling UE 100, and enables restraint of the overlapping of the radio resources.

Further, when detecting the notification signal, the UE 100 starts the random access procedure. On the basis of the random access procedure, the scheduling UE 100 transmits, to the UE 100, a temporary identifier used for transmitting the radio resource assigned to the UE 100. This enables the scheduling UE 100 to manage the radio resource by using the temporary identifier designated by the UE 100, and thus, management of the radio resource such as transmission of the assignment information of the radio resource and the assignment of the radio resource is facilitated, which makes it possible to reduce a load on the scheduling UE 100.

Further, in the random access procedure, the UE 100 omits the transmission of information for an RRC connection, and performs the RRC connection by using a setting value previously defined for D2D communication. Thus, the UE 100 is capable of quickly establishing the connection with the scheduling UE 100.

Further, in the random access procedure, the scheduling UE 100 omits the transmission of the contention resolution message. Thus, the scheduling UE 100 is capable of quickly establishing the connection with the UE 100. Further, the scheduling UE 100 is capable of restraining consumption of a battery.

Further, the UE 100 establishes only a PHY connection with the scheduling UE 100 and starts standing by for a message in the PHY layer from the scheduling UE 100. Thus, when the scheduling UE 100 transmits the message in the PHY by broadcast or group cast, the UE 100 that starts the standing by is capable of receiving the message in the PHY.

Further, when there is no data to be exchanged, the UE 100 performs a discontinuous reception in which the radio transceiver 110 is discontinuously activated. This enables the UE 100 to stop supplying power to the radio transceiver 110, and thus, it is possible to restrain the consumption of a battery.

Further, when not detecting the notification signal, the UE 100 enables the scheduling function. Thus, when there is no scheduling UE 100 around the UE 100, the UE 100 that enables the scheduling function is capable of representing the surrounding UEs 100 to assign the radio resource, which makes it possible to restrain the overlapping of the radio resources.

Further, when the notification signal is not detected and the battery remaining amount exceeds a threshold value, the UE 100 enables the scheduling function. Thus, the UE 100 is capable of restraining the battery remaining amount from being depleted immediately after the assignment of the radio resource is started.

Further, the scheduling UE 100 receives a buffer state report from the UE 100. The scheduling UE 100 performs the assignment of the radio resource on the UE 100 in accordance with the buffer state report. Thus, the scheduling UE 100, which is capable of grasping an amount of untransmitted data of the UE 100, is capable efficiently performing the assignment of the radio resource.

Further, the untransmitted data is classified into a plurality of logical channel groups different in priority. The UE 100 transmits the buffer state report indicating an amount of untransmitted data of each of the plurality of logical channel groups. The scheduling UE 100 performs the assignment of the radio resource on the UE 100 in accordance with the priority based on the buffer state report. Thus, the UE 100 having the untransmitted data high in priority is capable of more quickly transmitting the untransmitted data high in priority than another UE 100.

Further, instead of performing the retransmission process, the scheduling UE 100 repeatedly transmits the assignment information of the radio resource in response to a request from the UE 100 or in accordance with the types of communication schemes between the scheduling UE 100 and the UE 100. This enables the scheduling UE 100 to improve the error tolerance without performing a complicate process.

Further, when the scheduling UE 100 detects the notification signal from another scheduling UE 100 and the synchronization timing for the D2D communication is deviated, a correction for aligning the synchronization timing is performed. Thus, even when the different UEs 100 perform the D2D communication, the scheduling UE 100 is capable of restraining generation of a reception failure due to the synchronization deviation.

Further, in order to align the synchronization timing, the scheduling UE 100 matches the head of a subframe next to a predetermined subframe with the head of a subframe of another scheduling UE 100, without setting a predetermined subframe of the scheduling UE 100. This enables the scheduling UE 100 to easily align the synchronization timing.

Further, when detecting the notification signal from another scheduling UE 100, the UE 100 transmits to the scheduling UE 100 the adjacent scheduling UE information indicating, to the scheduling UE 100, that the notification signal from the another scheduling UE 100 is detected. This enables the scheduling UE 100 to know the information on a surrounding scheduling UE 100, and thus, for example, it is possible to start the operation for synchronizing with another scheduling UE 100.

Further, after establishing the connection with the scheduling UE 100, the UE 100 stops searching the scheduling UE, and when detecting the interference, resumes searching the scheduling UE. This enables the UE 100 to restrain uselessly searching a scheduling UE 100 and restrain consumption of a battery.

Further, when receiving the specific information that is set toward the specific UE 100 from another UE 100 and the scheduling UE 100 is not the specific UE 100, the scheduling UE 100 broadcasts the specific information in order to transfer the specific information.

Further, when the received strength of the notification signal of the scheduling UE 100 is equal to or less than a threshold value, the UE 100 may enable the scheduling function of the UE 100. Thus, even if the transmission power of the notification signal decreases due to a decrease of the battery remaining amount of the scheduling UE 100, when the UE 100 acts as the scheduling UE, it is possible to restrain a decrease of a scheduling area in which the assignment of the radio resource is performed.

Further, the scheduling UE 100 receives the battery information from the UE 100. The scheduling UE 100 requests, instead of the scheduling UE 100, the UE 100 to act as the scheduling UE 100, on the basis of the battery information and the battery remaining amount of the scheduling UE 100. Thus, when the remaining amount of the scheduling UE 100 is depleted, it is possible to restrain quickly stopping the assignment of the radio resource.

Further, when the UE 100 acts as the scheduling UE instead of the scheduling UE 100, the scheduling UE 100 stops transmitting the notification signal of the scheduling UE 100 in alignment with the timing at which the UE 100 start transmitting the notification signal. This eliminates the overlapping of the transmission of the notification signal, and thus, the surrounding UE 100 is capable of restraining simultaneous discovery of a plurality of scheduling UEs 100 including the scheduling UE 100 that stops the assignment of the radio resource.

[Other Embodiments]

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, in the above-described embodiment, when in a so-called public safety situation, the scheduling UE 100 performs the assignment of the radio resource; however, this is not limiting. For example, when the scheduling UE 100 is present within a coverage of a cell managed by the eNB 200 (when the scheduling UE 100 receives a reference signal from the eNB 200), the assignment of the radio resource may be performed on the UE 100 present outside the coverage of the cell. In this case, the scheduling UE 100 may use a substitute identifier (Substitute C-RNTI) to assign a temporary identifier of a cell assigned to the scheduling UE 100, to the UE 100 outside the coverage of the radio resource, and may use a temporary identifier obtained by the scheduling UE 100 inquiring the network to assign the radio resource to the UE 100 outside the coverage. The UE 100 which resides outside the coverage and to which the radio resource is assigned from the scheduling UE 100, may use the radio resource to perform the D2D communication with the surrounding UEs 100, and may perform the cellular communication via the scheduling UE 100 (or the surrounding UEs 100).

Further, in the above-described embodiment, when the battery has sufficient power, the UE 100 activates the scheduling function; however, this is not limiting. The UE 100 may activate the scheduling function even when the battery has no sufficient power. Thus, for example, when there is data to be urgently transmitted, the UE 100 is capable of performing the assignment of the radio resource in order to transmit the data.

Further, in the above-described embodiment, when not detecting the notification signal from the scheduling UE 100, the UE 100 activates the scheduling function; however, this is not limiting. For example, even when receiving the notification signal, the UE 100 may activate the scheduling function if the received strength of the notification signal is equal to or less than a threshold value.

Further, in the above-described embodiment, the UE 100 may transmit the battery information after connecting the battery information to the scheduling UE 100 and regularly or aperiodically as well. For example, when the battery remaining amount falls below a threshold value indicating that the battery remaining amount is little or when the battery remaining amount exceeds a threshold value indicating that the battery remaining amount is much, the UE 100 may transmit the battery information.

Further, in the above-described embodiment (case 1A), when the scheduling UE 100 performs the synchronization correction, one of the scheduling UEs 100 perform the synchronization correction; however, the both scheduling UEs 100 different in synchronization timing may perform the synchronization correction.

Further, in the above-described embodiment (case 2B), the scheduling UE 100 transmits the handover request to handover the scheduling role; however, this is not limiting. For example, when receiving a handover request response with an indication of approving the handover of the scheduling role from the candidate UE 100 that receives the handover request, the scheduling UE 100 may determine that the handover of the scheduling role is completed. In this case, after receiving the handover request response, the scheduling UE 100 may transmit information indicating a timing at which the transmission target of the notification signal is switched and/or information on the UE 100 in which the radio resource was managed by the scheduling UE 100. Further, when receiving the handover request response with an indication of refusing the handover of the scheduling role, the scheduling UE 100 may newly transmit the handover request to another candidate UE 100.

In addition, the aforementioned embodiment has described an example in which the present invention is applied to the LTE system. However, the present invention is not limited to the LTE system, and may also be applied to systems other than the LTE system.

In addition, the entire content of Japanese Patent Application No. 2013-179434 (filed on Aug. 30, 2013) is incorporated herein by reference.

INDUSTRIAL APPLICABILITY

According to the invention-based mobile communication system and user terminal, when a user terminal that performs D2D communication performs assignment of a radio resource, it is possible to restrain overlapping of radio resources.

The invention claimed is:

1. A mobile communication system that supports D2D communication that is direct device-to-device communication, comprising:
   a first user terminal having a scheduling function of assigning a radio resource used for the D2D communication; and
   a second user terminal in which the assignment of the radio resource is not managed by the first user terminal, wherein
   in response to the scheduling function being enabled, the first user terminal broadcasts periodically or aperiodically a message including identification information indicating that the first user terminal is a scheduling terminal that performs the assignment of the radio resource, and
   when a signal including the message from the second user terminal is detected and a synchronization timing for the D2D communication is deviated with the second user terminal the first user terminal performs a correction for aligning the synchronization timing.

2. The mobile communication system according to claim 1, further comprising a third user terminal configured to search the scheduling terminal, wherein
when detecting a signal including the message by the searching for the scheduling terminal, the third user terminal establishes at least synchronization with the first user terminal broadcasting the message.

3. The mobile communication system according to claim 2, wherein
the third user terminal uses a signal including the message or a synchronization signal transmitted from the first user terminal to establish synchronization with the first user terminal.

4. The mobile communication system according to claim 2, wherein
in addition to the establishment of the synchronization, the third user terminal establishes a connection with the first user terminal.

5. The mobile communication system according to claim 2, wherein
when detecting a signal including the message, the third user terminal starts a random access procedure for establishing a connection with the first user terminal, and
the first user terminal transmits, on the basis of the random access procedure, a temporary identifier used for transmitting the radio resource assigned to the third user terminal, to the third user terminal.

6. The mobile communication system according to claim 5, wherein
in the random access procedure, the third user terminal omits transmission of information for a connection in an RRC layer, and
the third user terminal uses a setting value previously defined for the D2D communication to perform the connection in the RRC layer.

7. The mobile communication system according to claim 5, wherein
in the random access procedure, the first user terminal omits transmission of a contention resolution message used for determining whether or not the random access procedure is successful.

8. The mobile communication system according to claim 4, wherein
in between with the first user terminal, the third user terminal establishes only a connection in a PHY layer, and
after establishing the connection in the PHY layer, the third user terminal starts standing by for a message in the PHY layer from the first user terminal.

9. The mobile communication system according to claim 4, wherein
the third user terminal comprises a receiver configured to receive data from the first user terminal, and
after establishing the connection with the first user terminal, when there is no data to be exchanged, the third user terminal performs a discontinuous reception in which the receiver is discontinuously activated.

10. The mobile communication system according to claim 4, wherein
the third user terminal has the scheduling function, and when not detecting a signal including the message, the third user terminal enables the scheduling function.

11. The mobile communication system according to claim 10, wherein
when a signal including the message is not detected and a battery remaining amount exceeds a threshold value, the third user terminal enables the scheduling function.

12. The mobile communication system according to claim 4, wherein
after establishing a connection with the third user terminal, the first user terminal receives a buffer state report indicating an amount of untransmitted data from the third user terminal, and
the first user terminal performs the assignment of the radio resource on the third user terminal, in accordance with the buffer state report.

13. The mobile communication system according to claim 12, wherein
the untransmitted data is classified into a plurality of logical channel groups different in priority,
the third user terminal transmits the buffer state report indicating an amount of the untransmitted data of each of the plurality of logical channel groups, and
the first user terminal performs the assignment of the radio resource on the third user terminal, in accordance with the priority based on the buffer state report.

14. The mobile communication system according to claim 4, wherein
the first user terminal performs the assignment of the radio resource on the third user terminal, after establishing the connection with the third user terminal, and
instead of performing a retransmission process of retransmitting assignment information of the radio resource based on a retransmission request from the third user terminal, the first user terminal repeatedly transmits the assignment information of the radio resource in response to a request from the third user terminal or in accordance with a type of communication scheme with the third user terminal.

15. The mobile communication system according to claim 1, wherein
in order to align the synchronization timing, the first user terminal matches a head of a subframe next to the predetermined subframe of the first user terminal with a head of a subframe of the second user terminal, without setting a predetermined subframe of the first user terminal.

16. The mobile communication system according to claim 4, further comprising a fourth user terminal different from the first user terminal and the third user terminal, wherein
after establishing a connection with the first user terminal, the third user terminal searches the scheduling terminal, and
when detecting a signal including the message from the fourth user terminal, the third user terminal transmits, to the first user terminal, scheduling terminal information indicating that the signal including the message is detected from the fourth user terminal.

17. The mobile communication system according to claim 4, wherein
after establishing a connection with the first user terminal, the third user terminal stops searching the scheduling terminal, and
when detecting interference, the third user terminal resumes searching the scheduling terminal.

18. The mobile communication system according to claim 1, further comprising a third user terminal configured to broadcast specific information that is set toward a specific user terminal, wherein
when the specific information is received from the third user terminal and the specific user terminal is not the first user terminal, the first user terminal broadcasts the specific information in order to transfer the specific information.

19. The mobile communication system according to claim 4, wherein after establishing a connection with the first user terminal, the third user terminal newly detects a signal including the message from the first user terminal, and when a signal intensity of the newly detected signal including the message is equal to or less than a threshold value, the third user terminal enables the scheduling function of the third user terminal.

20. The mobile communication system according to claim 4, wherein after establishing a connection with the third user terminal, the first user terminal receives battery information indicating a state of a battery from the third user terminal, and the first user terminal requests, on the basis of the battery information and a battery remaining amount of the first user terminal, the third user terminal to act as the scheduling terminal instead of the first user terminal.

21. The mobile communication system according to claim 20, wherein when the third user terminal acts as the scheduling terminal, the first user terminal stops broadcasting the message in alignment with a timing at which the third user terminal starts broadcasting the message.

22. A first user terminal in a mobile communication system that supports D2D communication that is direct device-to-device communication, comprising:

a controller configured to control a scheduling function of assigning a radio resource used for the D2D communication, wherein in response to the scheduling function being enabled, the controller controls to broadcast periodically or aperiodically a message including identification information indicating that the first user terminal is a scheduling terminal configured to perform the assignment of the radio resource, and when the controller detects a signal including the message from a second user terminal in which the assignment of the radio resource is not managed by the first user terminal, and a synchronization timing for the D2D communication is deviated with the second user terminal the controller performs a correction for aligning the synchronization timing.

* * * * *